(12) United States Patent
Chang et al.

(10) Patent No.: US 11,758,586 B2
(45) Date of Patent: Sep. 12, 2023

(54) RANDOM ACCESS METHOD, TERMINAL DEVICE, AND NETWORK DEVICE

(71) Applicant: Huawei Technologies Co., Ltd., Shenzhen (CN)

(72) Inventors: Junren Chang, Beijing (CN); Zhenzhen Cao, Beijing (CN); Bingzhao Li, Beijing (CN); Haibo Xu, Beijing (CN); Xuelong Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/875,134

(22) Filed: May 15, 2020

(65) Prior Publication Data
US 2020/0288507 A1 Sep. 10, 2020

Related U.S. Application Data

(63) Continuation of application No. PCT/CN2018/115361, filed on Nov. 14, 2018.

(30) Foreign Application Priority Data

Nov. 17, 2017 (CN) .......................... 201711148671.2

(51) Int. Cl.
*H04W 74/08* (2009.01)
*H04L 5/00* (2006.01)
(Continued)

(52) U.S. Cl.
CPC ....... *H04W 74/0833* (2013.01); *H04L 5/0092* (2013.01); *H04L 5/0094* (2013.01); *H04W 56/001* (2013.01); *H04W 72/1273* (2013.01)

(58) Field of Classification Search
CPC ............ H04W 74/0833; H04W 56/001; H04L 5/0092; H04L 5/0094
See application file for complete search history.

(56) References Cited

U.S. PATENT DOCUMENTS 10,999,870 B2 * 5/2021 Ou ....................... H04W 74/008
2010/0074204 A1 * 3/2010 Meylan ................. H04L 1/1887
370/329
(Continued)

FOREIGN PATENT DOCUMENTS

CN 101827450 A 9/2010
EP 2876955 A1 5/2015
(Continued)

OTHER PUBLICATIONS

Vivo: "BSR and SR and BSR cancel due to deactivation of LCH", 3GPP TSG-RAN WG2 Meeting #99, R2-1708490, Aug. 21-25, 2017, 2 pages, Berlin, Germany.
Qualcomm Incorporated: "4-step RACH procedure consideration", 3GPP TSG-RAN WG1 #88, R1-1702593, Feb. 13-17, 2017, 13 pages, Athens, Greece.
(Continued)

*Primary Examiner* — Kevin M Cunningham
(74) *Attorney, Agent, or Firm* — Slater Matsil, LLP

(57) ABSTRACT

A method includes: performing, by a terminal device, data transmission based on a configuration parameter of a currently activated first bandwidth part BWP, where the configuration parameter of the first BWP includes at least one of a first resource offset, a first bandwidth, and a first subcarrier spacing; determining, by the terminal device, a first random access resource and a second configuration parameter for random access, where the second configuration parameter includes at least one of a second resource offset, a second bandwidth, and a second subcarrier spacing; sending, by the terminal device, a random access request to the network
(Continued)

device on the first random access resource; and receiving, by the terminal device, a random access response based on the second configuration parameter, where the random access response is sent by the network device based on the random access request.

12 Claims, 8 Drawing Sheets

(51) Int. Cl.
*H04W 56/00* (2009.01)
*H04W 72/1273* (2023.01)

(56) References Cited

U.S. PATENT DOCUMENTS

| | | | |
|---|---|---|---|
| 2019/0045549 A1* | 2/2019 | Wu | H04W 72/085 |
| 2019/0103953 A1* | 4/2019 | Liao | H04W 76/28 |
| 2019/0364602 A1* | 11/2019 | Yi | H04W 72/04 |
| 2020/0045702 A1* | 2/2020 | Chen | H04W 72/0453 |
| 2020/0235896 A1* | 7/2020 | Lee | H04W 74/0833 |
| 2021/0144700 A1* | 5/2021 | Lee | H04L 5/0094 |

FOREIGN PATENT DOCUMENTS

| | | |
|---|---|---|
| EP | 3089542 A1 | 11/2016 |
| EP | 3089542 A4 | 1/2017 |
| EP | 3591887 A1 | 1/2020 |
| RU | 2577028 C2 | 3/2016 |
| WO | 2016188158 A1 | 12/2016 |
| WO | 2017181992 A1 | 10/2017 |
| WO | 2019083277 A1 | 5/2019 |
| WO | 2019094781 A2 | 5/2019 |

OTHER PUBLICATIONS

SAMSUNG: Random Access in RRC Connected: Bandwidth Part Aspects, 3GPP TSG-RAN WG2 #100, R2-1713372, Nov. 27-Dec. 1, 2017, 3 pages, Reno, United States.

Panasonic, "Numerology for Msg2 and Msg4 for RRC_CONNECTED UEs", 3GPP TSG-RAN WG1 Meeting 90bis R1-1718764, Oct. 9-13, 2017, 4 pages, Prague, CZ.

Samsung, "DL/UL Resource Allocation", 3GPP TSG RAN WG1 Meeting NR#3 R1-1716004, Sep. 18-21, 2017, 12 pages, Nagoya, Japan.

3GPP TS 36.331 V14.4.0 (Sep. 2017), 3rd Generation Partnership Project; Technical Specification Group Radio Access Network; Evolved Universal Terrestrial Radio Access (E-UTRA);Radio Resource Control (RRC);Protocol specification (Release 14), 753 pages.

3GPP TS 36.321 V14.4.0 (Sep. 2017), 3rd Generation Partnership Project; Technical Specification Group Radio Access Network; Evolved Universal Terrestrial Radio Access (E-UTRA); Medium Access Control (MAC) protocol specification (Release 14), 108 pages.

3GPP TS 38.331 V0.1.0 (Oct. 2017), 3rd Generation Partnership Project; Technical Specification Group Radio Access Network; NR;Radio Resource Control (RRC); Protocol specification (Release 15), Sep. 2017, 154 pages.

3GPP TS 38.214 V1.0.0 (Sep. 2017), 3rd Generation Partnership Project; Technical Specification Group Radio Access Network; NR; Physical layer procedures for data (Release 15), Sep. 2017, 32 pages.

3GPP TS 38.213 V1.0.0 (Sep. 2017), 3rd Generation Partnership Project;Technical Specification Group Radio Access Network; NR; Physical layer procedures for control (Release 15), Sep. 2017, 6 pages.

3GPP TS 38.321 V1.1.0 (Nov. 2017), 3rd Generation Partnership Project; Technical Specification Group Radio Access Network; NR; Medium Access Control (MAC) protocol specification (Release 15), Nov. 2017, 64 pages.

* cited by examiner

RANDOM ACCESS METHOD, TERMINAL DEVICE, AND NETWORK DEVICE

CROSS-REFERENCE TO RELATED APPLICATIONS

This application is a continuation of International Application No. PCT/CN2018/115361, filed on Nov. 14, 2018, which claims priority to Chinese Patent Application No. 201711148671.2, filed on Nov. 17, 2017. The disclosures of the aforementioned applications are hereby incorporated by reference in their entireties.

TECHNICAL FIELD

This application relates to the communications field, and more specifically, to a random access method, a terminal device, and a network device.

BACKGROUND

A concept of bandwidth part (BWP) is introduced in a new-generation wireless communications technology (NR). On a broadband carrier, a network device may configure one or more downlink BWPs and one or more uplink BWPs for a terminal device. Each BWP corresponds to a group of configuration parameters, and the configuration parameters include a supported subcarrier spacing, a supported bandwidth size, and a supported frequency location. The bandwidth size is a quantity of consecutive physical resource blocks (PRB) included in the BWP, and the frequency location is a location of the BWP in an entire cell bandwidth or an entire carrier bandwidth.

When a terminal device accesses a cell or a broadband carrier in idle mode, a BWP corresponding to initial access of the terminal device may be usually referred to as an initial BWP. Usually, one cell or one broadband carrier may have a plurality of initial BWPs. After the terminal device accesses a network device, a data transmission BWP that is configured by the network device for the terminal device according to a requirement is referred to as an activated BWP. The BWP may be dynamically activated/deactivated, and the BWP used by the terminal device can be quickly adjusted in a dynamic activation/deactivation manner.

In the current system, when the terminal device transmits data on a currently activated BWP, for example, a first BWP, and is triggered to perform random access, the terminal device performs random access on the first BWP. However, this causes a random access failure. For example, the network device schedules, based on a configuration parameter of the first BWP, for example, a first configuration parameter, a resource used by the terminal device to receive a random access response, and a resource used by the terminal device to send a random access message 3. If the configuration parameter (that is, the first configuration parameter) of the first BWP is different from a configuration parameter of a BWP (e.g., an initial BWP) used by the terminal device to perform random access previously, for example, when resource offsets are different, the terminal device cannot determine a location at which the network device sends a random access response message and the resource used by the terminal device to send the random access message 3. As a result, the terminal device cannot successfully receive the random access response message, and consequently, random access fails. For another example, if there is no random access resource in the first BWP, the terminal device cannot successfully send a random access request, and therefore cannot continue a subsequent random access procedure. Consequently, random access fails.

SUMMARY

This application provides a random access method, a terminal device, and a network device, to improve a random access success rate.

According to a first aspect, a random access method is provided, including: performing, by a terminal device, data transmission based on a configuration parameter of a currently activated first bandwidth part BWP, where the configuration parameter of the first BWP includes at least one of a first resource offset, a first bandwidth, and a first subcarrier spacing; determining, by the terminal device, a first random access resource and a second configuration parameter for random access, where the second configuration parameter includes at least one of a second resource offset, a second bandwidth, and a second subcarrier spacing; sending, by the terminal device, a random access request to the network device on the first random access resource; and receiving, by the terminal device, a random access response based on the second configuration parameter, where the random access response is sent by the network device based on the random access request.

In the current system, when the terminal device performs data transmission on the currently activated BWP (e.g., the first BWP), random access fails. For example, the network device schedules, based on the first configuration parameter, a resource used by the terminal device to receive the random access response. If a configuration parameter (e.g., the first configuration parameter) of the first BWP is different from a configuration parameter of a BWP (e.g., an initial BWP) used by the terminal device to perform random access previously, for example, when resource offsets are different, the terminal device cannot determine a location at which the network device sends the random access response message. As a result, the terminal device cannot successfully receive the random access response message, and consequently, random access fails. For another example, if there is no random access resource in the first BWP, the terminal device cannot successfully send a random access request, and therefore cannot continue a subsequent random access procedure. Consequently, random access fails. Alternatively, interference to another terminal device may be caused.

According to the method in this embodiment of this application, when the terminal device performs data transmission on the currently activated BWP, if the terminal device is triggered to perform the random access procedure, the terminal device performs random access based on the first random access resource and the second configuration parameter, instead of performing random access on the currently activated BWP. When determining that the terminal device is triggered to perform random access, the network device performs a corresponding random access procedure based on the first random access resource and the second configuration parameter. The terminal device can send the random access request on the first random access resource, and in the subsequent random access procedure, for example, when the terminal device receives the random access response message, resources perceived by the network device and the terminal device are the same. Therefore, a random access success rate can be improved, and interference to another terminal device can be reduced.

In a possible implementation, the method further includes: sending, by the terminal device, a random access message 3 to the network device based on the random access response.

In a possible implementation, the receiving, by the terminal device, a random access response based on the second configuration parameter includes: determining, by the terminal device, first scheduling information based on the second configuration parameter, where the first scheduling information is used to indicate a first resource; and receiving, by the terminal device on the first resource, the random access response sent by the network device.

In a possible implementation, the sending, by the terminal device, a random access message 3 to the network device based on the random access response includes: parsing, by the terminal device based on the second configuration parameter, second scheduling information carried in the random access response, where the second scheduling information is used to indicate a second resource; and sending, by the terminal device, the random access message 3 to the network device on the second resource.

In a possible implementation, the first random access resource and the second configuration parameter are associated with the first BWP; or the first random access resource and the second configuration parameter are associated with a second BWP; or the first random access resource is a cell-specific random access resource, and the cell-specific random access resource is associated with the second configuration parameter; or the first random access resource and the second configuration parameter are associated with a cell-defining synchronization signal block SSB.

A plurality of types of first random access resources and second configuration parameters are defined, so that random access can be performed more flexibly.

Further, the second BWP is any one of the following: an initial BWP associated with the first BWP, an initial BWP associated with a third BWP, an initial BWP, a cell-defining bandwidth part BWP, and a BWP associated with a cell-defining SSB, where the third BWP is a BWP deactivated when the first BWP is activated.

That the first random access resource and the second configuration parameter are associated with the first BWP is equivalent to that the first random access resource and the second configuration parameter are configured while the first BWP is configured. In this way, a configuration rule can be simplified.

If the second BWP is an initial BWP associated with the third BWP, an initial BWP, a cell-defining bandwidth part BWP, or a BWP associated with a cell-defining SSB, because these BWPs have been configured in advance, in other words, the first random access resource and the second configuration parameter have been configured in advance, only an association between the first BWP and the second BWP needs to be configured when the first BWP is configured, and information about the first random access resource and information about the second configuration parameter do not need to be carried in corresponding signaling, so that signaling overheads can be reduced.

In a possible implementation, the information about the first random access resource and/or the information about the second configuration parameter are/is carried in radio resource control RRC reconfiguration message; and/or the information about the first random access resource and/or the information about the second configuration parameter are/is carried in a system broadcast message.

The information about the first random access resource and/or the information about the second configuration parameter are/is carried in existing signaling, so that interworking with the current system can be implemented to a greater extent.

In a possible implementation, the RRC reconfiguration message or the system broadcast message carries a configuration parameter of the second BWP, the first random access resource and the second configuration parameter are associated with the second BWP, and the configuration parameter of the second BWP includes the second configuration parameter.

In a possible implementation, the method further includes: receiving, by the terminal device, first indication information sent by the network device, where the first indication information is used to deactivate or release the second BWP; and deactivating or releasing, by the terminal device, the second BWP based on the first indication information, and continuing to maintain the second configuration parameter of the second BWP.

In a possible implementation, when the terminal device performs the random access procedure or after the terminal device initiates random access, the method further includes: stopping, by the terminal device, receiving BWP activation/deactivation indication information from the first BWP, stopping monitoring downlink control information of the first BWP, deactivating the first BWP, or releasing the first BWP.

In a possible implementation, when the terminal device performs the random access procedure, the method further includes: if the terminal device receives indication information for deactivating the first BWP, stopping, by the terminal device, the random access procedure, or determining, by the terminal device, that the current random access procedure fails.

In a possible implementation, before the sending, by the terminal device, a random access request to the network device on the first random access resource, the method further includes: activating, by the terminal device, the second BWP.

In a possible implementation, the method further includes: receiving, by the terminal device, a random access message 4 sent by the network device; and activating, by the terminal device, the first BWP.

To be specific, if the terminal device deactivates the first BWP in the random access procedure, the terminal device may activate the first BWP after random access succeeds.

In a possible implementation, when the terminal device performs the random access procedure, the method further includes: receiving, by the terminal device, second indication information sent by the network device, where the second indication information is used to activate a fourth BWP; and performing, by the terminal device, the random access procedure based on a fifth BWP associated with the fourth BWP, where the fifth BWP is an initial BWP associated with the fourth BWP, an initial BWP, a cell-defining bandwidth part BWP, or a BWP associated with a cell-defining SSB.

In this embodiment of this application, the terminal device activates a new BWP, e.g., the fourth BWP, in the random access procedure, and the terminal device and the network device may consider that the random access fails. In this case, the terminal device may continue to perform random access based on the fifth BWP associated with the fourth BWP, so that a random access success rate can be improved.

In a possible implementation, the first BWP is associated with a plurality of random access resources; and the determining, by the terminal device, a first random access resource includes: randomly selecting, by the terminal device, a random access resource from the plurality of random access resources as the first random access resource.

In a possible implementation, the first BWP is associated with a plurality of initial BWPs; and the determining, by the terminal device, a first random access resource includes: determining, by the terminal device, the first random access resource based on at least one of the following: using, by the terminal device, a random access resource of a first initial BWP of the plurality of initial BWPs as the first random access resource, where the random access resource of the first initial BWP is the same as a random access resource associated with the first BWP, and/or the first BWP is an initial BWP with a best synchronization signal block SSB measurement result in the plurality of initial BWPs, and the measurement result is at least one of reference signal received power RSRP, reference signal received quality RSRQ, and a signal to interference plus noise ratio SINR; using, by the terminal device, a random access resource of any one of the plurality of initial BWPs as the first random access resource; and selecting, by the terminal device, a random access resource of an initial BWP that has a largest resource intersection with the first BWP and that is in the plurality of BWPs as the first random access resource.

The terminal device selects the first random access resource and the second configuration parameter by using a plurality of rules, so that system flexibility can be improved.

According to a second aspect, a random access method is provided, including: performing, by a network device, data transmission based on a configuration parameter of a currently activated first bandwidth part BWP, where the configuration parameter of the first BWP includes at least one of a first resource offset, a first bandwidth, and a first subcarrier spacing; determining, by the network device, a first random access resource and a second configuration parameter; receiving, by the network device on the first random access resource, a random access request sent by a terminal device; and sending, by the network device, a random access response to the terminal device based on the random access request and the second configuration parameter, where the second configuration parameter includes at least one of a second resource offset, a second bandwidth, and a second subcarrier spacing.

In a possible implementation, the method further includes: receiving, by the network device, a random access message 3 sent by the terminal device based on the random access response.

In a possible implementation, the first random access resource and the second configuration parameter are associated with the first BWP; or the first random access resource and the second configuration parameter are associated with a second BWP; or the first random access resource is a cell-specific random access resource, and the cell-specific random access resource is associated with the second configuration parameter; or the first random access resource and the second configuration parameter are associated with a cell-defining synchronization signal block SSB.

In a possible implementation, the second BWP is any one of the following: an initial BWP associated with the first BWP, an initial BWP associated with a third BWP, an initial BWP, a cell-defining bandwidth part BWP, and a BWP associated with a cell-defining SSB, where the third BWP is a BWP deactivated when the first BWP is activated.

In a possible implementation, before the determining, by the network device, a first random access resource and a second configuration parameter, the method further includes: sending, by the network device, a radio resource control RRC reconfiguration message and/or a system broadcast message to the terminal device, where the RRC reconfiguration message carries information about the first random access resource and/or information about the second configuration parameter, and/or the system broadcast message carries information about the first random access resource and/or information about the second configuration parameter.

In a possible implementation, the RRC reconfiguration message or the system broadcast message includes a configuration parameter of the second BWP, and the first random access resource and the second configuration parameter are associated with the second BWP.

According to a third aspect, this application provides a terminal device, configured to perform the method according to any one of the first aspect or the possible implementations of the first aspect.

According to a fourth aspect, this application provides a network device, configured to perform the method according to any one of the second aspect or the possible implementations of the second aspect.

According to a fifth aspect, this application provides a terminal device. The terminal device includes a memory, a processor, a transceiver, and a computer program that is stored in the memory and that can be run on the processor. When executing the computer program, the processor performs the method according to any one of the first aspect or the possible implementations of the first aspect.

According to a sixth aspect, this application provides a network device. The network device includes a memory, a processor, a transceiver, and a computer program that is stored in the memory and that can be run on the processor. When executing the computer program, the processor performs the method according to any one of the second aspect or the possible implementations of the second aspect.

According to a seventh aspect, this application provides a computer-readable medium, configured to store a computer program. The computer program includes an instruction used to perform the method according to any one of the first aspect or the possible implementations of the first aspect.

According to an eighth aspect, this application provides a computer-readable medium, configured to store a computer program. The computer program includes an instruction used to perform the method according to any one of the second aspect or the possible implementations of the second aspect.

According to a ninth aspect, this application provides a computer program product including an instruction. When the computer program product is run on a computer, the computer is enabled to perform the method according to any one of the first aspect or the possible implementations of the first aspect.

According to a tenth aspect, this application provides a computer program product including an instruction. When the computer program product is run on a computer, the computer is enabled to perform the method according to any one of the second aspect or the possible implementations of the second aspect.

According to an eleventh aspect, this application provides a chip, including an input interface, an output interface, at least one processor, and a memory. The input interface, the output interface, the processor, and the memory communicate with each other by using an internal connection path. The processor is configured to execute code in the memory, and when executing the code, the processor is configured to perform the method according to any one of the first aspect or the possible implementations of the first aspect.

According to a twelfth aspect, this application provides a chip, including an input interface, an output interface, at least one processor, and a memory. The input interface, the output interface, the processor, and the memory communicate with each other by using an internal connection path. The processor is configured to execute code in the memory, and when executing the code, the processor is configured to perform the method according to any one of the second aspect or the possible implementations of the second aspect.

DETAILED DESCRIPTION OF ILLUSTRATIVE EMBODIMENTS

The following describes technical solutions of this application with reference to accompanying drawings.

It should be understood that, the technical solutions of this application may be applied to various communications systems, such as a global system for mobile communications (GSM), a code division multiple access (CDMA) system, a wideband code division multiple access (WCDMA) system, a general packet radio service (GPRS), a long term evolution (LTE) system, a long term evolution advanced (LTE-A) system, an LTE frequency division duplex (FDD) system, an LTE time division duplex (TDD) system, a universal mobile telecommunications system (UMTS), a worldwide interoperability for microwave access (WiMAX) communications system, a next-generation communications system (for example, a fifth-generation (5G) communications system), an integrated system of a plurality of access systems, and an evolved system. The 5G system may be also referred to as a new radio access technology (NR) system.

Figure 1:
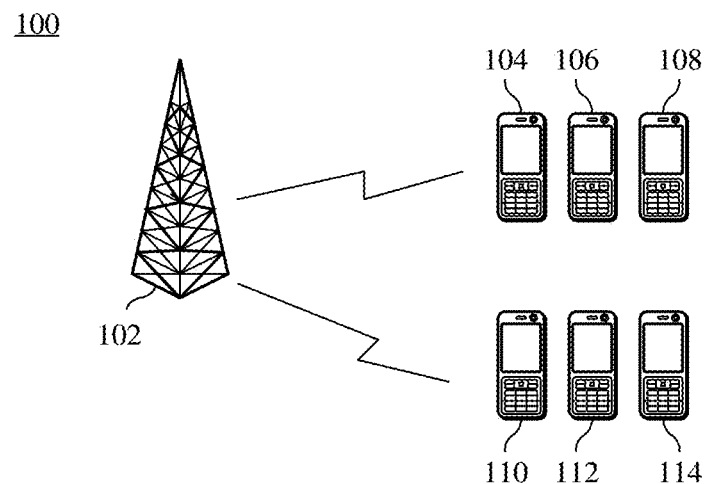
FIG. 1 is a schematic architectural diagram of a communications system according to an embodiment of this application.

For ease of understanding of the embodiments of this application, a communications system applicable to the embodiments of this application is first described in detail with reference to FIG. 1. FIG. 1 is a schematic diagram of a communications system 100 applicable to an embodiment of this application. As shown in FIG. 1, the communications system 100 may include a network device 102 and terminal devices 104 to 114.

It should be understood that the network device 102 may be any device with a wireless transceiver function or a chip that may be disposed in the device. The device includes, but is not limited to, a base station (for example, a NodeB NodeB or an evolved NodeB eNodeB), a network device in a fifth-generation (5G) communications system (for example, a transmission point (TP), a transmission reception point (TRP), a gNB, a base station, or a small cell device), a network device in a future communications system, an access node in a wireless fidelity (Wi-Fi) system, a wireless relay node, a wireless backhaul node, and the like.

The network device 102 may communicate with a plurality of terminal devices (for example, the terminal devices 104 to 114 shown in the figure).

It should be understood that the terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device in this embodiment of this application may be a mobile phone, a tablet computer (Pad), a computer with a wireless transceiver function, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like. An application scenario is not limited in this embodiment of this application. In this application, the terminal device and the chip that may be disposed in the terminal device are collectively referred to as a terminal device.

In addition, the communications system 100 may also be a public land mobile network (PLMN), a device to device (D2D) network, a machine to machine (M2M) network, or another network. FIG. 1 is only a simplified schematic diagram of an example for ease of understanding, and the communications system 100 may further include another network device and another terminal device that are not shown in FIG. 1.

For ease of understanding of the embodiments of this application, the following briefly describes a BWP with reference to the communications system shown in FIG. 1.

In NR, different terminal devices in a same cell may have different transmitting or receiving capabilities. Therefore, a system may configure a corresponding bandwidth for each terminal device. The bandwidth configured for the terminal device is referred to as a BWP, and the terminal device performs transmission on the BWP of the terminal device. The system may configure different BWPs for different terminal devices. The configuration parameter corresponding to each BWP includes: a supported subcarrier spacing, a supported bandwidth size, and a supported resource offset. The subcarrier spacing may be configured by using numerology. The numerology includes a subcarrier spacing configuration and a cyclic prefix length configuration. The bandwidth is a quantity of consecutive PRBs included in the BWP. A frequency location is a location of the BWP in an entire cell bandwidth or an entire carrier bandwidth.

Figure 2:
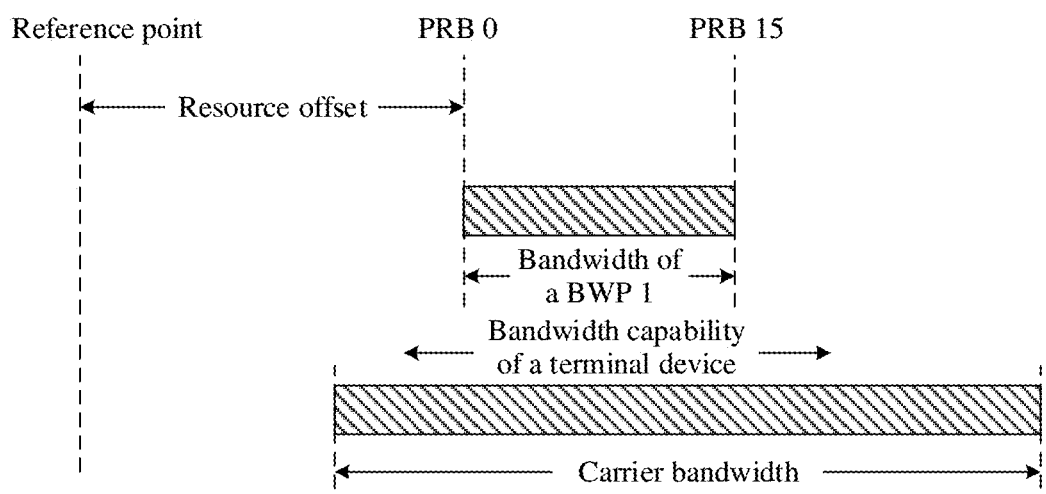
FIG. 2 is a schematic diagram of a BWP.

FIG. 2 is a schematic diagram of a BWP resource. As shown in FIG. 2, a reference point is a location of a PRB 0 (not a PRB 0 in the figure) at an absolute resource granularity, and may be generally a lowest location of an entire cell bandwidth or an entire carrier bandwidth. A start location of a BWP 1 is a location of the PRB 0 shown in the figure. When configuring the BWP 1 for the terminal device, the network device may notify the terminal device of a resource offset between the PRB 0 and the reference point shown in FIG. 2. In addition, the network device may further notify the terminal device of a PRB index in given numerology. A PRB indicated by the PRB index is an end location of the BWP 1. For example, the end location of the BWP 1 shown in FIG. 2 is a PRB 15, that is, the BWP 1 includes the PRB 0 to the PBR 15. Alternatively, the network device may directly notify the terminal device of a bandwidth of the BWP 1.

In other words, a BWP may be uniquely determined based on numerology, a resource offset, and a bandwidth size, or a BWP is associated with configuration parameter numerology, a resource offset, and a bandwidth.

In addition, generally, a bandwidth capability of the terminal device is less than a bandwidth of an entire cell or an entire broadband carrier, but is greater than or equal to a bandwidth of a specific BWP configured for the terminal device.

When the terminal device accesses a cell or a broadband carrier in idle mode, a BWP corresponding to initial access of the terminal device is referred to as an initial BWP (initial BWP). Generally, one cell or one broadband carrier may have a plurality of initial BWPs. The initial BWP may be understood as a dedicated BWP configured for initial access in a system. After the terminal device accesses the network device, a data transmission BWP that is configured by the network device for the terminal device according to a requirement is referred to as an activated BWP.

In this embodiment of this application, the initial BWP is understood as a BWP used to support the UE in initial access. Alternatively, it may be understood that the UE performs random access on the initial BWP. Alternatively, it may be understood that the UE performs random access based on a random access resource of the initial BWP and a configuration parameter of the initial BWP. In this case, the configuration parameter of the initial BWP may not include information about the random access resource of the initial BWP. Alternatively, it may be understood that the UE performs random access based on the configuration parameter of the initial BWP. In this case, the configuration parameter of the initial BWP may include the information about the random access resource of the initial BWP. It should be understood that the random access resource in this embodiment of this application is a resource, that is, a physical random access channel (PRACH) resource, that is used by the terminal device to send a random access request.

In addition, generally, the initial BWP has other necessary information, such as an SSB, system information (for example, a bandwidth of the BWP and numerology), and information about a corresponding random access resource, that supports the UE in initial access. In this application, the name of initial BWP is merely for ease of description, and each BWP having the foregoing features falls within the scope of this application regardless of whether the BWP is definitely referred to as an initial BWP.

In a first version of NR, that is, in Rel-15 of 5G NR, one terminal device has a maximum of one activated downlink BWP and one activated uplink BWP at any moment in one serving cell. To dynamically switch the activated BWP of the terminal device, according to a current method, the network device dynamically controls, by using downlink control information (Downlink Control Information, DCI), the terminal device to switch between BWPs with different configuration parameters. Details are as follows:

(1) DCI for scheduling downlink transmission is used to control the terminal device to switch a downlink BWP. For example, the DCI for scheduling downlink transmission may include a BWP identifier (Identification, ID). In this way, the terminal device may be instructed to activate a downlink BWP corresponding to the BWP ID and receive, on the downlink BWP, a physical downlink shared channel (Physical Downlink Shared Channel, PDSCH) scheduled by using the DCI.

(2) DCI for scheduling uplink transmission is used to control the terminal device to switch an uplink BWP. For example, the DCI for scheduling uplink transmission may include a BWP ID. In this way, the terminal device may be instructed to activate an uplink BWP corresponding to the BWP ID and receive, on the uplink BWP, a physical uplink shared channel (Physical Uplink Shared Channel, PUSCH) scheduled by using the DCI.

BWP switching may also be understood as BWP activation and deactivation. For example, it is assumed that a downlink BWP currently activated by the terminal device is a BWP 1. When a BWP ID included in DCI for scheduling downlink transmission that is received by the terminal device indicates a BWP 2, that the terminal device performs BWP switching means that the terminal device needs to deactivate the downlink BWP 1 and activate the downlink BWP 2. The BWP used by the terminal device can be quickly adjusted in a dynamic activation/deactivation manner.

The network may dynamically change, in a BWP activation/deactivation manner, another configuration such as a bandwidth of an activated BWP used by the terminal device.

In an NR system, the terminal device may implement uplink synchronization by using a random access procedure (Random access procedure), or the terminal device may obtain an uplink grant by using a random access procedure, or if a timing alignment timer of the terminal device expires, the terminal device performs random access (RA) again to implement uplink synchronization.

Specifically, when the terminal device is in connected mode, the terminal device may initiate a contention-based random access procedure in the following cases:

Case 1: The terminal device is triggered to send a scheduling request (Scheduling Request, SR), but currently no SR resource is available.

Case 2: SR transmissions of the terminal device reach a maximum quantity.

Case 3: The TAT of the terminal device expires and uplink data arrives.

It should be understood that this application is not limited to triggering random access only in the foregoing three cases, and the terminal device may also initiate random access in another case.

Figure 3:
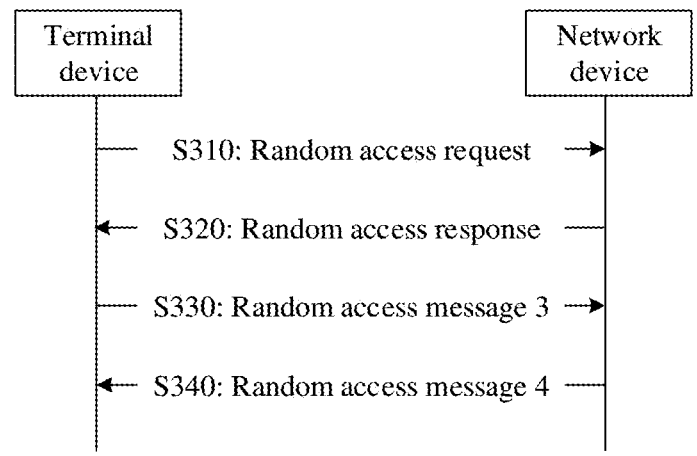
FIG. 3 is a schematic flowchart of a contention-based random access method in the current system.

FIG. 3 shows a contention-based random access procedure.

According to a contention-based random access method shown in FIG. 3, a process of performing the contention-based random access method in a conventional cell or on a carrier includes S310 to S340.

S310: A terminal device sends a random access message 1, that is, a random access request or a random access preamble, to a network device.

The random access request is sent on a random access resource, that is, an uplink random access channel (RACH), and a preamble carried in the random access request indicates a size of a random access message 3 that needs to be sent by the terminal device.

S320: The network device sends a random access response (Random Access Response), that is, an RA Msg2, to the terminal device.

After receiving the random access request, the network device sends a random access response on a downlink shared channel. The random access response is generated by a Media Access Control (MAC) layer. For specific content of the random access response, refer to FIG. 4. A number on the right of FIG. 4 indicates a quantity of bytes occupied by a row.

Figure 4:
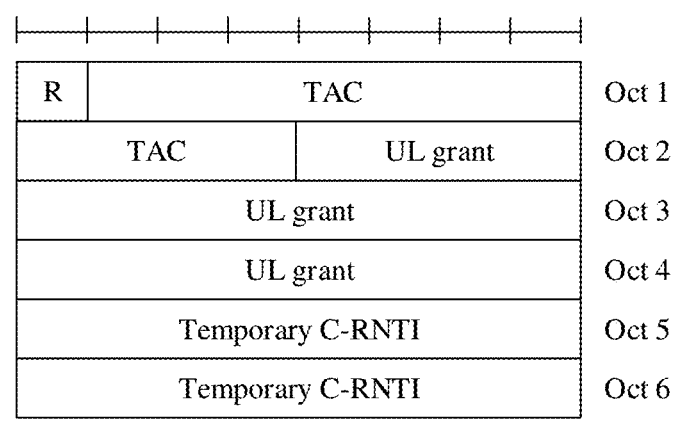
FIG. 4 is a schematic diagram of specific content of a random access response message.

In FIG. 4, a timing advance command (TAC) field includes a TA value that is calculated by the network device and that needs to be adjusted by the terminal device in uplink sending.

An uplink grant field indicates information about an uplink resource allocated to the terminal device in S330.

A temporary cell radio network temporary identifier (Temporary C-RNTI) is a temporary identifier allocated to the UE.

A reserved field is temporarily not used and is reserved for subsequent extension and the like.

S330: The terminal device sends the random access message 3 on an uplink shared channel based on a resource indicated by the random access response.

S340: The network device sends a random access message 4 to the terminal device.

The random access message 4 is used to resolve a conflict problem caused when a plurality of terminal devices use a same preamble.

In non-contention-based random access, the terminal device and the network device perform only S310 and S320. For details, refer to the current system. Details are not described herein.

In the foregoing three cases, when random access is triggered, the terminal device performs random access on a currently triggered cell or carrier by default. However, in a multi-BWP scenario, a BWP resource on a cell or a broadband carrier is configured very dynamically and flexibly. For example, different BWPs may correspond to different resource offsets. In addition, there is a cross relationship between BWPs. For example, when there is an activated BWP and one or more initial BWPs, if the terminal device performs random access on a currently activated BWP (for example, denoted as a first BWP), and the first BWP and the one or more initial BWPs have different configuration parameters, for example, a resource offset, a subcarrier spacing, or a bandwidth size, random access fails or interference to another terminal device is caused.

For example, if the configuration parameter (for example, denoted as a first configuration parameter) of the first BWP is different from the configuration parameter of the initial BWP of the terminal device, the terminal device cannot determine a location at which the network device sends the random access response message and a resource used by the terminal device to send the random access message 3 in the random access procedure. For example, a resource offset of the first BWP is five PRBs, a resource offset of the initial BWP is six PRBs, and a subcarrier spacing and a bandwidth size of the first BWP are the same as those of the initial BWP. It is assumed that the network device sends the random access response message in a PRB whose index is 2, that is, the network device sends the random access response message in the second PRB of the first BWP. However, the terminal device considers that the network device sends the random access response message in the second PRB of the initial BWP. Because the resource offsets of the first BWP and the initial BWP are different, resources perceived by the terminal device and the network device are actually different resources. As a result, the terminal device cannot successfully receive the random access response message, and consequently, random access fails. Alternatively, a transmission conflict with another terminal device may be caused on these PBRs, and mutual interference is caused.

For another example, if there is no random access resource in the first BWP, the terminal device cannot successfully send a random access request, and cannot continue a subsequent random access procedure. Consequently, random access fails.

In view of this, this application provides a random access method, to improve a random access success rate and reduce interference to another terminal device.

The following describes in detail the embodiments of this application with reference to the accompanying drawings.

Figure 5:
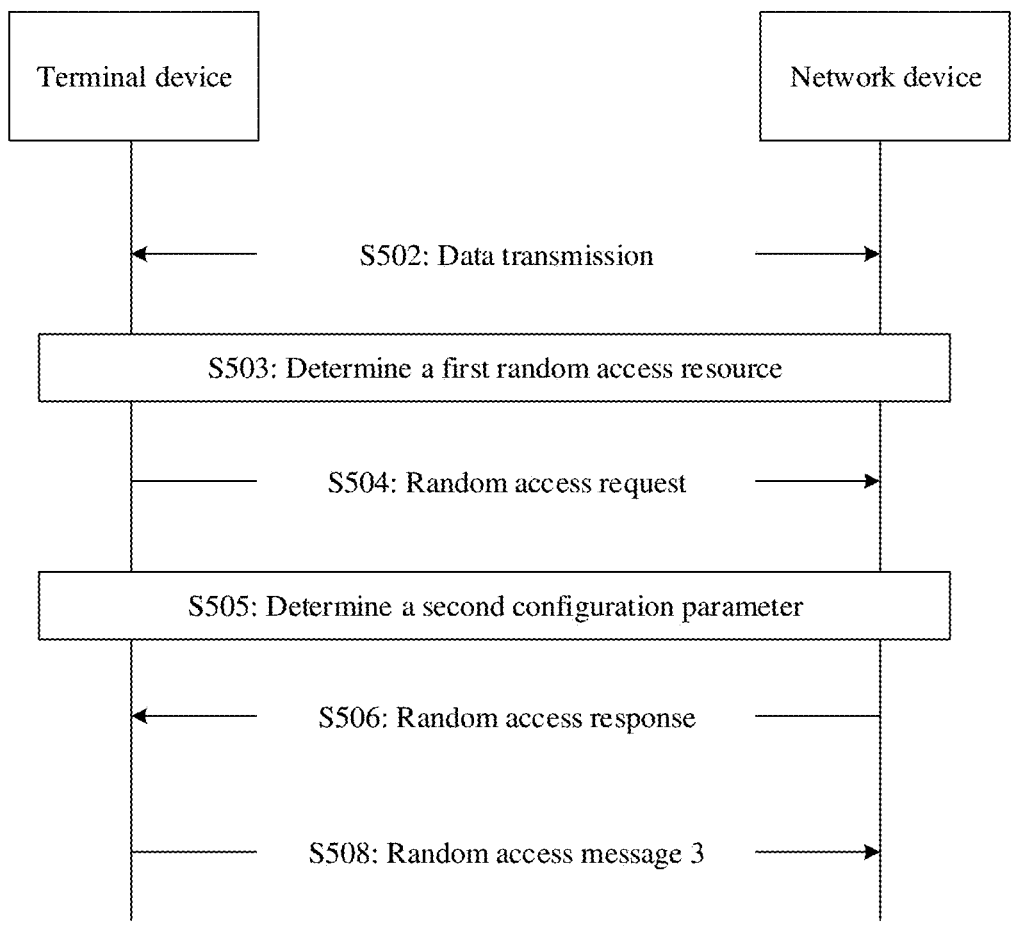
FIG. 5 is a schematic flowchart of a random access method according to an embodiment of this application.

FIG. 5 is a schematic flowchart of a random access method from a perspective of device interaction according to an embodiment of this application.

S502: A terminal device performs data transmission based on a configuration parameter of a currently activated first BWP, where the configuration parameter of the first BWP includes at least one of a first resource offset, a first bandwidth, and a first subcarrier spacing.

The resource offset may be understood as a relative resource offset between a start location (for example, a subcarrier or a PRB) of the BWP and an absolute reference point. In other words, the resource offset is related to a location of the BWP. In this case, the first resource offset may be understood as a relative resource offset between the start location of the first BWP and the absolute reference point. The resource offset may be represented by using a quantity of PRBs. However, this is not limited in this embodiment of this application.

The first bandwidth is a bandwidth size of the first BWP. The first subcarrier spacing is a subcarrier spacing of the first BWP, and a start location and/or an end location of a PRB at a frequency may be determined based on the subcarrier spacing.

It should be understood that when the terminal device performs data transmission based on the configuration parameter of the first BWP, a network device also performs data transmission with the terminal device based on the configuration parameter of the first BWP. It should be further understood that the so-called "data transmission" includes data sending and receiving. For example, when the terminal device sends data (for example, first data) to the network device based on the configuration parameter of the first BWP, the network device receives the first data based on the configuration parameter of the first BWP. When the network device sends data (for example, second data) to the terminal device based on the configuration parameter of the first BWP, the terminal device receives the second data based on the configuration parameter of the first BWP.

In this embodiment of this application, the terminal device may determine, based on a group of parameters configured by the network device for the terminal device: the resource offset, the bandwidth, and the first subcarrier spacing, a bandwidth size and a resource location that are supported by the terminal device, that is, may determine a BWP. Alternatively, it may be understood that the group of parameters correspond to a BWP.

It can be understood from this concept that a plurality of BWPs (for example, the first BWP) configured by the network device for the terminal device may have a same bandwidth and a same subcarrier spacing, but have different frequency offsets. In this case, the parameter of the first BWP and the second configuration parameter may include only a frequency offset. Alternatively, a plurality of BWPs configured by the network device for the terminal device may have a same frequency offset and a same subcarrier spacing, but have different bandwidths. In this case, the parameter of the first BWP and the second configuration parameter may include only a bandwidth. Alternatively, a plurality of BWPs configured by the network device for the terminal device may have a same frequency offset and a same bandwidth, but different subcarrier spacings. In this case, the parameter of the first BWP and the second configuration parameter may include only a subcarrier spacing. Parameters with a same value may be implemented in a predefined manner or in a manner specified by a system. However, this application is not limited thereto.

S504: The terminal device sends a random access request to the network device on a first random access resource. Correspondingly, the network device receives the random access request on the first random access resource.

Specifically, in a process in which the terminal device performs data transmission based on the configuration parameter of the first BWP, if the terminal device is triggered to perform a random access procedure, for example, the terminal device is triggered to perform the random access procedure in any one of the foregoing trigger cases (1) to (3), the terminal device may start to perform the random access procedure, that is, send the random access request to the network device on the first random access resource.

Optionally, before S504, the method may further include the following steps:

S503: The terminal device determines the first random access resource used to perform random access. Correspondingly, the network device determines the first random access resource used to perform random access.

To be specific, the terminal device first determines the first random access resource, and then starts to perform the random access procedure.

S506: The network device sends a random access response to the terminal device based on a second configuration parameter and a first random access request. Correspondingly, the terminal device receives the random access response based on the second configuration parameter.

The second configuration parameter includes at least one of a second resource offset, a second bandwidth, and a second subcarrier spacing. The second resource offset is used by the terminal device to determine a location of a resource (for example, a PRB). The second bandwidth is used by the terminal device to determine a bandwidth size (denoted as a band #1) that can be used in S506 and the following step S508. The second subcarrier spacing is a subcarrier spacing of the band #1.

Optionally, in a possible implementation of S506, the terminal device obtains first scheduling information based on the second configuration parameter, where the first scheduling information is used to indicate a first resource, and receives the random access response on the first resource.

In other words, the terminal device may first determine, based on the second configuration parameter and the first scheduling information, the first resource for sending the random access response message. For example, the first scheduling information may be a PRB index, and the terminal device may determine, based on the PRB index and the second configuration parameter, a location that is of a PRB indicated by the PRB index and that is in the band #1. Then, the terminal device detects or receives the random access response on the first resource.

It should be understood that the first random access resource corresponds to the second configuration parameter. To be specific, if the terminal device sends the random access request by using the first random access resource, the terminal device receives the random access response and sends a random access message 3, by using the second configuration parameter.

Optionally, before S506, the method may further include the following step:

S505: The terminal device determines the second configuration parameter used to perform random access. Correspondingly, the network device also determines the second configuration parameter used to perform random access.

To be specific, the terminal device first determines the second configuration parameter, and then receives the random access response based on the second configuration parameter.

It should be understood that S505 may be performed before S504, or may be performed after S504. This is not limited in this embodiment of this application. It should be further understood that S505 and S503 may be simultaneously performed, or S505 may be performed before S503, or S505 may be performed after S503. This is not limited in this embodiment of this application.

In the current system, when the terminal device performs data transmission on the currently activated BWP (that is, the first BWP), random access fails. For example, the network device schedules, based on the first configuration parameter, a resource used by the terminal device to receive the random access response. If the configuration parameter (that is, the first configuration parameter) of the first BWP is different from a configuration parameter of a BWP (that is, an initial BWP) used by the terminal device to perform random access previously, for example, when resource offsets are different, the terminal device cannot determine a location at which the network device sends the random access response message. As a result, the terminal device cannot successfully receive the random access response message, and consequently, random access fails. For another example, if there is no random access resource in the first BWP, the terminal device cannot successfully send the random access request, and cannot continue a subsequent random access procedure. Consequently, random access fails. Alternatively, interference to another terminal device may be caused.

According to the method in this embodiment of this application, when the terminal device performs data transmission on the currently activated BWP, if the terminal device is triggered to perform the random access procedure, the terminal device performs random access based on the first random access resource and the second configuration parameter, instead of performing random access on the currently activated BWP. When determining that the terminal device is triggered to perform random access, the network device performs a corresponding random access procedure based on the first random access resource and the second configuration parameter. The terminal device can send the random access request on the first random access resource, and in a subsequent random access procedure, for example, when the terminal device receives the random access response message, resources perceived by the network device and the terminal device are the same. Therefore, a random access success rate can be improved, and interference to another terminal device can be reduced.

Further, the method may further include the following steps:

S508: The terminal device sends the random access message 3 to the network device based on the random access response.

In a possible implementation of S508, the terminal device parses, based on the second configuration parameter, second scheduling information carried in the random access response message, where the second scheduling information is used to indicate a second resource, and sends the random access message 3 to the network device on the second resource.

In other words, the random access response message carries a second scheduling resource. After receiving the random access response message, the terminal device may determine the second resource based on the second scheduling resource and the second configuration parameter. For example, the second scheduling information may be a PRB index. The terminal device may determine, based on the PRB index and the second configuration parameter, a location that is of a PRB indicated by the PRB index and that is in the band #1, and then the terminal device sends the random access message on the one or more PRBs.

It should be understood that this embodiment of this application may be applied to contention-based random access, or may be applied to non-contention-based random access. However, this application is not limited to these two scenarios. This application may be further applied to another random access scenario. Particularly, when non-contention-based random access is performed, scheduling information of the random access response may also be received and parsed by using the first configuration parameter.

The following describes the first random access resource and the second configuration parameter in detail.

Optionally, the second configuration parameter is at least partially different from the first configuration parameter, and/or the resource of the first BWP does not include a random access resource, and the random access resource is used to send the random access request.

That the second configuration parameter is at least partially different from the first configuration parameter means that the second configuration parameter may be completely or partially different from the first configuration parameter. For example, the second resource offset may be different from the first resource offset, that is, a start location of the first BWP is different from a start location of the band #1. Alternatively, the second bandwidth is different from the first bandwidth, that is, a bandwidth size of the first BWP is different from a bandwidth size of the band #1. Alternatively, the second subcarrier spacing is different from the first subcarrier spacing, that is, a subcarrier spacing of the first BWP is different from a subcarrier spacing of the band #1.

That the resource of the first BWP does not include a random access resource means that the first BWP has no resource that can be used to send the random access request. In this case, the resource of the first BWP does not include the first random access resource.

Optionally, in an embodiment of this application, the first random access resource and the second configuration parameter are associated with the first BWP.

For example, when configuring the first BWP for the terminal device, or activating the first BWP, or being to activate the first BWP, the network device may configure the BWP 1 for the terminal device at the same time. For example, the network device notifies the terminal device of a configuration parameter of the BWP 1, that is, at least one of a resource offset, a bandwidth (that is, a bandwidth size), and a subcarrier spacing, or may further notify the terminal device of a random access resource of the BWP 1, or a random access resource of the BWP 1 may be predefined. When the terminal device performs data transmission on the first BWP, that is, when the terminal device performs data transmission based on the first configuration parameter, if random access is triggered, the terminal device performs random access on the BWP 1, that is, the terminal device sends the random access request on the random access resource (that is, the first random access resource) of the BWP 1. In addition, the terminal device performs a subsequent step of random access based on the configuration parameter (that is, at least one of the second resource offset, the second bandwidth, and the second subcarrier spacing) of the BWP 1, for example, receives the random access response or sends the random access message 3.

Optionally, in an embodiment of this application, the first random access resource and the second configuration parameter are associated with a second BWP; the first random access resource is a cell-specific random access resource, and the cell-specific random access resource is associated with the second configuration parameter; or the first random access resource and the second configuration parameter are associated with a cell-defining SSB.

For example, that the first random access resource and the second configuration parameter are associated with the second BWP may be understood as that the first random access resource and the second configuration parameter have a mapping relationship with the second BWP, or the terminal device may determine the first random access resource and the second configuration parameter based on the second BWP. Correspondingly, that the first random access resource and the second configuration parameter are associated with the cell-defining SSB may be understood as that the terminal device may determine the first random access resource and the second configuration parameter based on the cell-defining SSB, or the first random access resource and the second configuration parameter have a mapping relationship with the cell-defining SSB.

For example, that the first random access resource is a cell-specific random access resource may be understood as that all terminal devices in the cell send the random access request by using the first random access resource when performing random access. That the cell-specific random access resource is associated with the second configuration parameter may be understood as that the second configuration parameter may be determined based on the cell-specific random access resource, or the cell-specific random access resource may be determined based on the second configuration parameter, or the cell-specific random access resource has a mapping relationship with the second configuration parameter.

In this embodiment of this application, the cell-defining SSB (cell defining SSB) means that the terminal device may determine downlink timing of a current cell or a current carrier by using the SSB of this feature, and determine signal quality of the cell or the carrier based on a measurement result of the SSB.

Further, the second BWP may be any one of the following:

(1) An initial BWP associated with the first BWP.

For example, the initial BWP associated with the first BWP is denoted as an initial BWP 2. To be specific, the cell may have a plurality of initial BWPs, and different BWPs used for data transmission may correspond to different initial BWPs. That is, the initial BWP 2 is a specific BWP of the plurality of initial BWPs. The terminal device may determine the initial BWP 2 based on the currently activated BWP, that is, the first BWP. Therefore, when performing data transmission on the first BWP, if the terminal device is triggered to perform random access, the terminal device may perform random access on the initial BWP 2.

(2) An initial BWP associated with the third BWP.

For example, the initial BWP associated with the third BWP is denoted as an initial BWP 3. The BWP 3 is a BWP used when the terminal device performs data transmission on the third BWP and is triggered to perform random access. The third BWP is a BWP deactivated when the first BWP is activated.

In other words, when data transmission is performed on the first BWP, if random access is triggered, a BWP used to perform random access is the initial BWP 3. In other words, the terminal device performs random access on the BWP 3.

(3) A cell-defining BWP.

The cell-defining BWP may be understood as a BWP including a cell-specific random access resource. The terminal device in the cell may use the cell-defining BWP when performing random access.

(4) A BWP associated with the cell-defining SSB.

In this embodiment of this application, the BWP associated with the cell-defining SSB is a BWP in which the cell-defining SSB is located. When performing random access, the terminal device in the cell may use the BWP associated with the cell-defining SSB.

In this embodiment of this application, the BWP associated with the cell-defining SSB may be defined as a cell-defining BWP. However, this is not limited in this embodiment of this application.

(5) An initial BWP.

To be specific, the terminal device may perform random access by using any one of one or more BWPs in the cell.

Optionally, in this embodiment of this application, if the first BWP is associated with a plurality of random access resources, in S503, the terminal device may specifically randomly select a random access resource from the plurality of random access resources as the first random access resource. In other words, the first random access resource is any one of the plurality of random access resources.

Optionally, if the first BWP is associated with a plurality of initial BWPs, that is, the terminal device may perform random access on the plurality of initial BWPs, the terminal device may specifically perform at least one of the following rules in S503.

It should be understood that the initial BWP is a BWP on which the terminal device can perform random access. That the first BWP is associated with a plurality of initial BWPs may be understood as that the plurality of initial BWPs may be determined based on the first BWP, and the terminal device may perform random access on any one of the plurality of initial BWPs. It should be further understood that the BWP used for random access usually includes a random access resource.

Rule 1: The terminal device uses a random access resource of a first initial BWP of the plurality of initial BWPs as the first random access resource.

The random access resource of the first initial BWP is the same as the random access resource associated with the first BWP, and/or the first BWP is an initial BWP with a best synchronization signal block SSB measurement result in the plurality of initial BWPs. The measurement result is at least one of reference signal received power RSRP, reference signal received quality RSRQ, and a signal to interference plus noise ratio SINR.

Specifically, the first BWP is associated with a random access resource. If a random access resource of an initial BWP (that is, the first BWP) of a plurality of initial BWPs is the same as the random access resource associated with the first BWP, the terminal device uses the random access resource of the initial BWP as the first random access resource. Alternatively, the terminal device may measure SSBs sent on the plurality of BWPs, to obtain a plurality of measurement results or a plurality of groups of measurement results, for example, RSRP, received quality RSRQ, and/or SINR values. It is easy to understand that each initial BWP corresponds to one measurement result or one group of measurement results. Then, the terminal device selects, as the first random access resource, a random access resource of an initial BWP corresponding to one best measurement result or one group of best measurement results in the plurality of obtained measurement results or the plurality of groups of obtained measurement results, that is, a random access resource of an initial BWP corresponding to maximum RSRP, maximum received quality RSRQ, and/or a maximum SINR. If an initial BWP meets only one of the foregoing conditions, the terminal device may use a random access resource of any BWP that meets the foregoing condition as the first random access resource.

It is easy to understand that the terminal device uses the configuration parameter of the initial BWP as the second configuration parameter. In other words, the terminal device performs random access on the initial BWP.

Rule 2: The terminal device uses a random access resource of any one of the plurality of initial BWPs as the first random access resource.

In other words, the terminal device randomly selects a random access resource of any BWP of the plurality of BWPs as the first random access resource.

Rule 3: The terminal device selects a random access resource of an initial BWP that has a largest resource intersection with the first BWP and that is in the plurality of BWPs as the first random access resource.

In other words, the terminal device selects a random access resource of an initial BWP whose frequency band overlaps most of a frequency band of the first BWP and that is in the plurality of BWPs as the first random access resource.

Optionally, before S502 or S504, the method may further include:

sending, by the network device, an RRC reconfiguration message and/or a system broadcast message to the terminal device, where the RRC reconfiguration message carries information about the first random access resource and/or information about the second configuration parameter, and/or the system broadcast message carries information about the first random access resource and/or information about the second configuration parameter.

To be specific, the RRC reconfiguration message may carry the information about the first random access resource and the information about the second configuration parameter. Alternatively, the RRC reconfiguration message may carry the information about the first random access resource, and the system broadcast message may carry the information about the second configuration parameter. Alternatively, the RRC reconfiguration message may carry the information about the second configuration parameter, and the system broadcast message may carry the information about the first random access resource. Alternatively, the system broadcast message may carry the information about the first random access resource and the information about the second configuration parameter. This is not limited in this embodiment of this application.

In this case, in S504, the terminal device may specifically determine the first random access resource and the second configuration parameter based on the RRC reconfiguration message and/or the system broadcast message.

In other words, before performing random access, the terminal device may learn of the first random access resource and the second configuration parameter based on the RRC reconfiguration message and/or the system broadcast message, and then the terminal device may perform the random access procedure based on the first random access resource and the second configuration parameter.

Further, the RRC reconfiguration message or the system broadcast message includes the configuration parameter of the second BWP, and the configuration parameter of the second BWP includes the second configuration parameter.

Herein, it may be understood that the network device configures the second BWP for the network device by using the RRC reconfiguration message or the system broadcast message.

Optionally, the method may further include the following steps:

S510: The network device sends first indication information to the terminal device. The first indication information is used to deactivate or release the second BWP.

S512: The terminal device deactivates or releases the second BWP based on the first indication information, and continues to maintain the configuration parameter of the second BWP.

It should be understood that S510 and S512 may be performed before S502 or S504, or may be performed after S506 or S508. This is not limited in this embodiment of this application.

It should be further understood that, that the terminal device maintains the configuration parameter of the second BWP herein means that the terminal device continues to maintain or store the configuration parameter of the second BWP, and does not delete or discard the configuration parameter of the second BWP.

In other words, if the network device deactivates the second BWP before the terminal device performs random access, when the terminal device performs a random access procedure, or after the terminal device completes random access, the terminal device may ignore or not ignore the first deactivation command, but continues to perform random access on the second BWP. Alternatively, in a process in which the terminal device is triggered to perform random access again when performing data transmission on the first BWP, the terminal device still performs random access on the second BWP.

Optionally, before S504, the method may further include: activating, by the terminal device, the second BWP.

In other words, the terminal device first activates the second BWP, and then performs random access on the second BWP.

In addition, if the terminal device performs random access on the second BWP, it may also be understood that the terminal device has activated the second BWP, and then performs random access on the second BWP.

Optionally, in the random access procedure performed by the terminal device, the method further includes: performing, by the terminal device, at least one of the following operations: stopping, by the terminal device from the first BWP, receiving indication information for activating the BWP or deactivating the BWP; skipping, by the terminal device, monitoring downlink control information of the first BWP; deactivating, by the terminal device, the first BWP; and releasing, by the terminal device, the first BWP.

For example, in a process in which the terminal device performs 8504, 8506, or S508, or during execution of S504 and S506, or during execution of S506 and S508, or after S508 is performed but the terminal device has not succeeded in random access, the terminal device may stop performing the foregoing operations. In other words, if the terminal device receives, on the first BWP, indication information for activating or deactivating a BWP, the terminal device may not activate or deactivate the BWP based on the indication information, and/or the terminal device may no longer continue to monitor downlink control information on the first BWP, and/or the terminal device deactivates or releases the first BWP.

It should be understood that, that the terminal device releases the first BWP may be understood as that the terminal device no longer uses the first BWP.

Further, the method may further include: activating, by the terminal device, the first BWP after random access succeeds.

For example, in a contention-based random access procedure, if the first BWP is deactivated in the random access procedure, the terminal device may activate the first BWP after receiving a random access message 4.

For another example, in a non-contention-based random access procedure, if the first BWP is deactivated in the random access procedure, the terminal device may activate the first BWP after receiving a random access response.

Optionally, in the random access procedure performed by the terminal device, the method may further include: if the terminal device receives indication information for deactivating the first BWP, stopping, by the terminal device, the random access procedure, or determining, by the terminal device, that the current random access procedure fails.

Specifically, if the network device needs to deactivate the first BWP, the network device sends, to the terminal device, indication information for deactivating the first BWP, to deactivate the first BWP. After receiving the indication information for deactivating the first BWP, the terminal device stops the current random access procedure, that is, no longer performs a subsequent random access procedure, or the terminal device considers that the current random access fails.

Optionally, in the random access procedure performed by the terminal device, the method may further include: receiving, by the terminal device, second indication information sent by the network device, where the second indication information is used to activate a fourth BWP; and performing, by the terminal device, the random access procedure based on a fifth BWP associated with the fourth BWP, where the fifth BWP is an initial BWP associated with the fourth BWP, an initial BWP, a cell-defining bandwidth part BWP, or a BWP associated with a cell-defining SSB.

Specifically, if another BWP, for example, the fourth BWP, is activated in the random access procedure, the terminal device performs random access with reference to a scenario in which the first BWP is activated, that is, the currently activated BWP is the first BWP. For details, refer to the foregoing description. Details are not described herein again. It should be understood that the fourth BWP herein may be understood as the first BWP described above, and the fifth BWP may be understood as the second BWP described above. For detailed description of the fifth BWP, refer to the description of the second BWP. Details are not described herein again.

In this embodiment of this application, the terminal device activates a new BWP, that is, the fourth BWP, in the random access procedure, and the terminal device and the network device may consider that the random access fails. In this case, the terminal device may continue to perform random access based on the fifth BWP associated with the fourth BWP. If the currently activated BWP includes more than the fourth BWP, that is, may include a plurality of BWPs, the terminal device selects a BWP from the plurality of newly activated BWPs that include the random access resource, to perform random access. For a specific selection method, refer to the foregoing described rule 1 to rule 3. Details are not described herein again.

Figure 6:
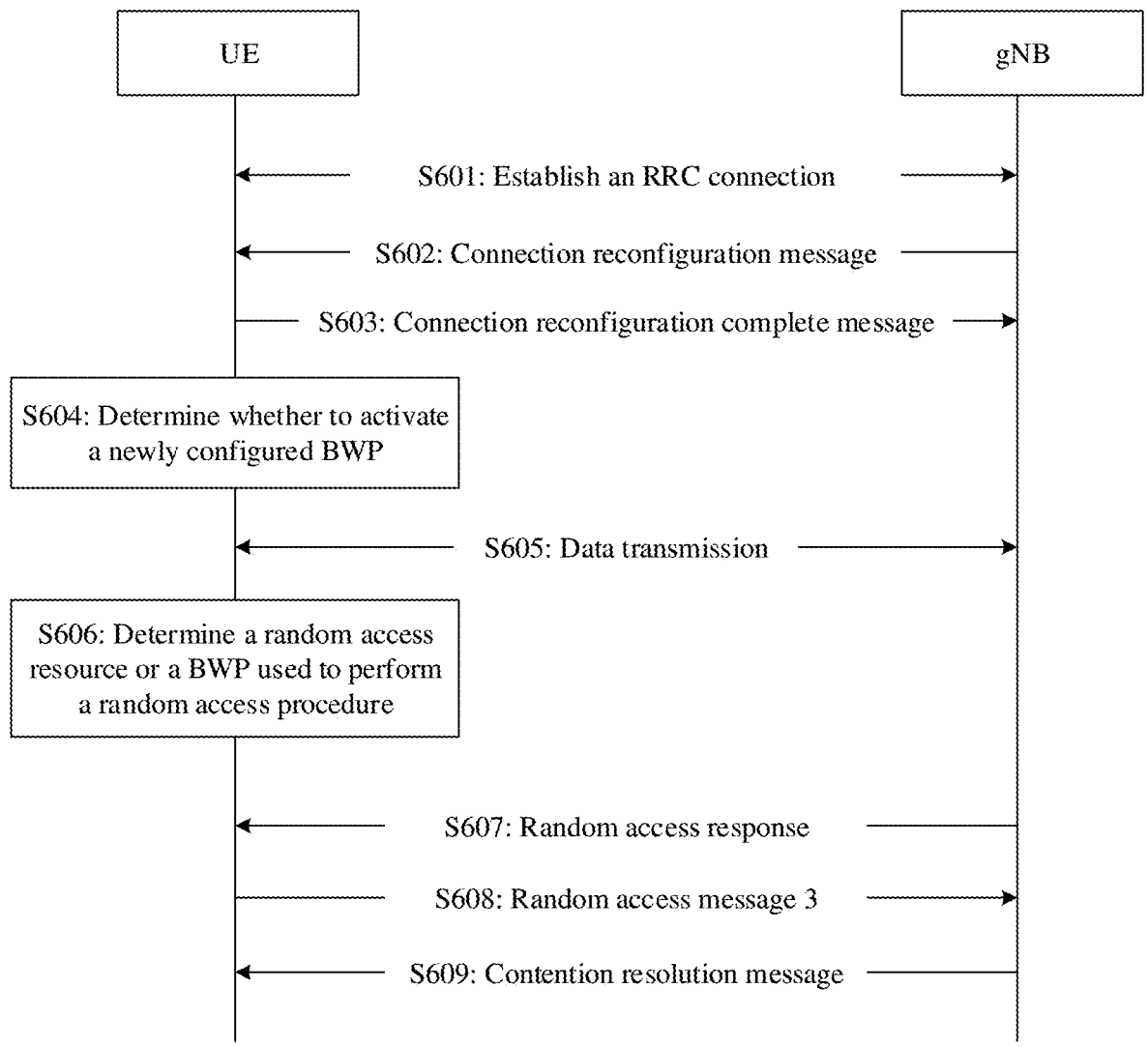
FIG. 6 is a schematic flowchart of a random access method according to another embodiment of this application.

The following describes this application in detail with reference to two specific embodiments of a random access method shown in FIG. 6 by using an example in which a terminal device is UE and a network device is a gNB.

FIG. 6 shows a specific embodiment of a random access method.

S601: UE performs an RRC connection to a gNB.

The UE initiates an RRC connection setup procedure in idle mode or in an idle state, to set up an RRC connection with the gNB. Specifically, when accessing a broadband cell or a broadband carrier of the gNB, the UE may perform access on an initial BWP.

It should be understood that, for the UE in idle mode, the UE may identify the initial BWP only after entering a connected mode, and before entering the connected mode, the UE considers the initial BWP as a common cell.

S602: The gNB sends a connection reconfiguration message to the UE.

After the UE accesses the gNB, the gNB determines, based on information such as a current service status of the UE and a resource status of a current broadband cell, to configure and/or activate one or more new BWPs for the UE. Then, the gNB sends an RRC connection reconfiguration message to the UE, to configure one or more new BWPs for the UE.

Optionally, in the RRC connection reconfiguration message, the gNB may send indication information for activating one or more BWPs to the UE, to activate the one or more BWPs for the UE.

The gNB may further add any one of the following to the RRC connection reconfiguration message:

A: information about a random access resource associated with a cell-defining SSB, and configuration information of a BWP associated with the cell-defining SSB.

The configuration information of the BWP associated with the cell-defining SSB may include: a resource offset, numerology, and a bandwidth (or a bandwidth size) of the BWP associated with the cell-defining SSB.

B: information about an initial BWP associated with an activated BWP.

When a new activated BWP or a to-be-activated BWP is configured for the UE, the gNB configures, for the UE, information about an initial BWP associated with the activated BWP or the to-be-activated BWP. The information may include a resource offset, numerology, and a bandwidth.

For example, the new activated BWP of the UE is a BWP 3, and an initial BWP associated with the BWP 3 is an initial BWP 1. When the gNB configures or activates the BWP 3 for the UE, the gNB also specifies an initial BWP 1 associated with the BWP 3 for the UE.

It should be noted that a bandwidth range of the initial BWP 1 may be a subset of a bandwidth range of the BWP 3. In practice, the initial BWP 1 and the initial BWP 3 may overlap or may not overlap. This is not limited in this application. For example, the activated BWP may not have a random access resource, and the initial BWP 1 associated with the activated BWP does not overlap with the activated BWP.

C: configuration information associated with the random access procedure.

The configuration information includes a random access resource, a resource offset, numerology, and a bandwidth that are related to the random access procedure.

D: indication information for deactivating the initial BWP.

If a gNB network configures and activates a new BWP for the UE, the initial BWP is deactivated in the reconfiguration message, and the UE still continues to maintain the resource offset, the numerology, and the bandwidth corresponding to the initial BWP.

For example, it is assumed that after the UE establishes a connection to the gNB, the UE first works in the BWP 4. Then, when configuring the BWP 3 for the UE, the network may deactivate the BWP 4. However, in this case, the UE needs to continue to maintain the resource offset, the numerology, and the bandwidth corresponding to the initial BWP 1, for use during subsequent random access.

E: two sets of parameters of the configured new BWP.

The configured new BWP has two sets of independent parameters. One set of parameters are parameters related to execution of the random access procedure, that is, a random access resource, a resource offset, numerology, and a bandwidth that need to be applied in the random access procedure when the UE performs random access. The other set of parameters are parameters related to common service data transmission performed by the UE, that is, parameters such as a resource offset, numerology, and a bandwidth that are applied when the UE performs service data transmission.

In addition to adding A to E to the RRC reconfiguration message in S602, A to D may also be sent in a broadcast message of the gNB. This is not limited in this embodiment of this application.

S603: After receiving the RRC connection reconfiguration message, the UE configures a new BWP, and sends an RRC connection reconfiguration complete message to the gNB.

S604: Further, after receiving the RRC connection reconfiguration message, the UE determines, according to an RRC instruction, whether to activate the configured new BWP.

Optionally, if the configured new BWP is not activated in an RRC connection reconfiguration process, the configured new BWP may be activated by using a dedicated BWP activation/deactivation message.

S605: The UE performs data transmission by using the activated BWP.

S606: The UE determines a random access resource or a BWP used to perform the random access procedure.

In a process in which the UE performs data transmission with the gNB by using the activated BWP, after the UE is triggered to perform random access, corresponding to A to E in S602, the UE may specifically perform one of the following operations:

Operation A1: The UE determines to initiate random access on a random access resource associated with a cell-defining SSB, and sends a random access request to the gNB.

Specifically, regardless of whether the UE currently activates one or more BWPs, or whether the BWP currently activated by the UE corresponds to an associated random access resource, the UE performs random access on the random access resource associated with the cell-defining SSB.

Alternatively, it may be understood that when the UE is triggered to perform random access, the UE actively activates the cell-defining BWP, and initiates random access on the cell-defining BWP.

Operation B1: The UE initiates random access on the initial BWP associated with the activated BWP.

Operation C1: The UE initiates random access based on the configuration information associated with the random access procedure.

Operation D1: The UE performs random access on a random access resource of the initial BWP based on the stored configuration information of the initial BWP.

Operation E1: The UE initiates random access based on the configured BWP and a configuration parameter related to random access execution.

S607: The UE receives a random access response based on a resource offset, numerology, and a bandwidth corresponding to any one of A to D.

Corresponding to the foregoing operations A1 to E1, the UE specifically performs one of the following operations in S607:

Operation A2: When receiving the random access response, the UE determines a resource for reception of the random access response based on configuration information of the BWP associated with the cell-defining SSB, or the UE determines reception of the random access response based on configuration information of a cell-defining BWP, that is, determines PRB information, numerology information, and the like, that are used to transmit the random access response.

In addition, the UE determines scheduling information of the random access message 3, a PRB used to send the random access message 3, and the like based on the configuration information of the BWP associated with the cell-defining SSB or the configuration information of the cell-defining BWP.

Operation B2: The UE determines reception of the random access response based on a resource offset, numerology, and a bandwidth of the initial BWP associated with the activated BWP. Further, after receiving the random access response, the UE determines scheduling information of the random access message 3 based on the resource offset, the numerology, and the bandwidth of the initial BWP associated with the activated BWP.

Operation C2: The UE determines reception of the random access response based on a configured resource offset, configured numerology, and a configured bandwidth related to random access. Further, after receiving the random access response, the UE determines the scheduling information of the random access message 3 based on the resource offset, the numerology, and the bandwidth related to the random access.

Operation D2: The UE determines reception of the random access response based on a stored resource offset, stored numerology, and a stored bandwidth of the initial BWP. Further, after receiving the random access response, the UE determines scheduling information of the random access message 3 based on the stored resource offset, the stored numerology, and the stored bandwidth of the initial BWP.

Operation E2: The UE determines reception of the random access response based on a configured configuration parameter that is related to the activated BWP and random access execution. Further, after receiving the random access response, the UE determines the scheduling information of the random access message 3 based on information about the configuration parameter that is related to the activated BWP and the random access execution.

S608: After receiving the random access response, the UE sends the random access message 3 according to the scheduling information of the corresponding random access message 3 determined in the operations A2 to E2.

S609: After sending the random access message 3, the UE receives a contention resolution message sent by the gNB, and determines whether the random access procedure of the UE succeeds.

Therefore, according to the random access method in this application, when the network device determines that the terminal device is triggered to perform random access, the terminal device and the network device perform a random access procedure based on agreed information or parameters, so that resources perceived the network device and the terminal device are the same, thereby improving a random access success rate.

The foregoing describes in detail the random access method provided in the embodiments of this application with reference to FIG. 1 to FIG. 6. The following describes a terminal device and a network device provided in the embodiments of this application with reference to FIG. 7 to FIG. 10.

Figure 7:
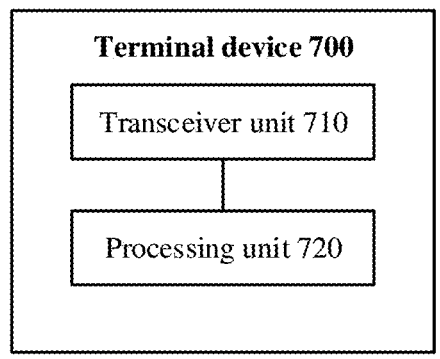
FIG. 7 is a schematic block diagram of a terminal device according to an embodiment of this application.

FIG. 7 is a schematic block diagram of a terminal device 700 according to an embodiment of this application. The terminal device 700 includes: a transceiver unit 710, configured to perform data transmission based on a configuration parameter of a currently activated first bandwidth part BWP, where the configuration parameter of the first BWP includes at least one of a first resource offset, a first bandwidth, and a first subcarrier spacing; and a processing unit 720, configured to determine a first random access resource and a second configuration parameter for random access, where the second configuration parameter includes at least one of a second resource offset, a second bandwidth, and a second subcarrier spacing.

The transceiver unit 710 is further configured to send a random access request to the network device on the first random access resource.

The transceiver unit 720 is further configured to receive a random access response based on the second configuration parameter, where the random access response is sent by the network device based on the random access request.

Optionally, the transceiver unit is further configured to send a random access message 3 to the network device based on the random access response.

Optionally, the processing unit is specifically configured to: determine first scheduling information based on the second configuration parameter, where the first scheduling information is used to indicate a first resource.

The transceiver unit is specifically configured to receive, on the first resource, the random access response sent by the network device.

Optionally, the processing unit is specifically configured to: parse, based on the second configuration parameter, second scheduling information carried in the random access response, where the second scheduling information is used to indicate a second resource.

The transceiver unit is specifically configured to send the random access message 3 to the network device on the second resource.

Optionally, the first random access resource and the second configuration parameter are associated with the first BWP; or the first random access resource and the second configuration parameter are associated with a second BWP; or the first random access resource is a cell-specific random access resource, and the cell-specific random access resource is associated with the second configuration parameter; or the first random access resource and the second configuration parameter are associated with a cell-defining synchronization signal block SSB.

Optionally, the second BWP is any one of the following: an initial BWP associated with the first BWP, an initial BWP associated with a third BWP, an initial BWP, a cell-defining bandwidth part BWP, and a BWP associated with a cell-defining SSB, where the third BWP is a BWP deactivated when the first BWP is activated.

Optionally, information about the first random access resource and/or information about the second configuration parameter are/is carried in radio resource control RRC reconfiguration message; and/or information about the first random access resource and/or information about the second configuration parameter are/is carried in a system broadcast message.

Optionally, the RRC reconfiguration message or the system broadcast message includes a configuration parameter of the second BWP, and the configuration parameter of the second BWP includes the second configuration parameter.

Optionally, the receiving unit is further configured to: receive first indication information sent by the network device, where the first indication information is used to deactivate or release the second BWP.

The processing unit deactivates or releases the second BWP based on the first indication information, and continues to maintain the second configuration parameter of the second BWP.

Optionally, the processing unit is further configured to: stop receiving BWP activation/deactivation indication information from the first BWP, stop monitoring downlink control information of the first BWP, deactivates the first BWP, or releases the first BWP.

Optionally, if the transceiver unit receives indication information for deactivating the first BWP, the processing unit stops a random access procedure, or the terminal device determines that a current random access procedure fails.

It should be understood that the terminal device 700 herein is embodied in a form of a functional unit. The term "unit" herein may refer to an application-specific integrated circuit (application specific integrated circuit, ASIC), an electronic circuit, a processor (for example, a shared processor, a special purpose processor, or a group processor) configured to execute one or more software or firmware programs, a memory, a logic merging circuit, and/or another appropriate component that supports the described function. In an optional example, a person skilled in the art may understand that the terminal device 700 may be specifically the terminal device in the foregoing method embodiment, and the terminal device 700 may be configured to perform the procedures and/or steps corresponding to the terminal device in the foregoing method embodiment. To avoid repetition, details are not described herein again.

Figure 8:
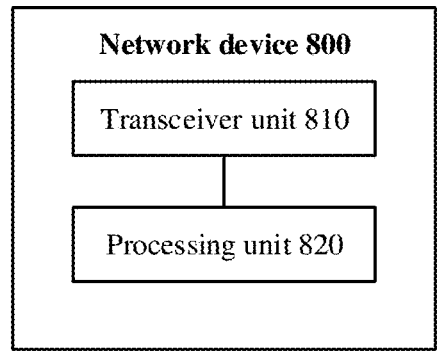
FIG. 8 is a schematic block diagram of a network device according to an embodiment of this application.

FIG. 8 is a schematic block diagram of a network device 800 according to an embodiment of this application. The network device 800 includes: a transceiver unit 810, configured to perform data transmission based on a configuration parameter of a currently activated first bandwidth part BWP, where the configuration parameter of the first BWP includes at least one of a first resource offset, a first bandwidth, and a first subcarrier spacing; and a processing unit 820, configured to determine a first random access resource and a second configuration parameter.

The transceiver unit 81o is further configured to receive, on the first random access resource, a random access request sent by a terminal device.

The transceiver unit 810 is further configured to send a random access response to the terminal device based on the random access request and the second configuration parameter, where the second configuration parameter includes at least one of a second resource offset, a second bandwidth, and a second subcarrier spacing.

Optionally, the transceiver unit is further configured to: receive a random access message 3 sent by the terminal device based on the random access response.

Optionally, the first random access resource and the second configuration parameter are associated with the first BWP; or the first random access resource and the second configuration parameter are associated with a second BWP; or the first random access resource is a cell-specific random access resource, and the cell-specific random access resource is associated with the second configuration parameter; or the first random access resource and the second configuration parameter are associated with a cell-defining synchronization signal block SSB.

Optionally, the second BWP is any one of the following: an initial BWP associated with the first BWP, an initial BWP associated with a third BWP, an initial BWP, a cell-defining bandwidth part BWP, and a BWP associated with a cell-defining SSB, where the third BWP is a BWP deactivated when the first BWP is activated.

Optionally, the transceiver unit is further configured to: send a radio resource control RRC reconfiguration message and/or a system broadcast message to the terminal device, where the RRC reconfiguration message carries information about the first random access resource and/or information about the second configuration parameter, and/or the system broadcast message carries information about the first random access resource and/or information about the second configuration parameter.

Optionally, the RRC reconfiguration message or the system broadcast message includes a configuration parameter of the second BWP, and the configuration parameter of the second BWP includes the second configuration parameter.

It should be understood that the network device 800 herein is embodied in a form of a functional unit. Herein the term "unit" may be an ASIC, an electronic circuit, a processor (for example, a shared processor, a dedicated processor, or a group processor) and a memory for executing one or more software or firmware programs, a logic merging circuit, and/or another appropriate component that supports the described function. In an optional example, a person skilled in the art may understand that the network device 800 may be specifically the network device in the foregoing method embodiment, and the network device 800 may be configured to perform the procedures and/or steps corresponding to the network device in the foregoing method embodiment. To avoid repetition, details are not described herein again.

Figure 9:
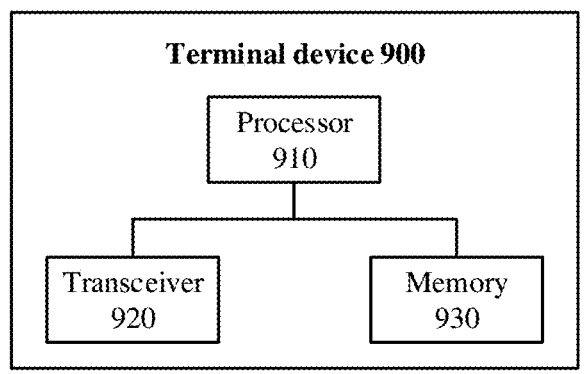
FIG. 9 is a schematic block diagram of another terminal device according to an embodiment of this application.

FIG. 9 shows a terminal device 900 according to an embodiment of this application. The terminal device may include a processor 910, a transceiver 920, and a memory 930. The processor 910, the transceiver 920, and the memory 930 communicate with each other by using an internal connection path. Related functions implemented by the processing unit 720 in FIG. 7 may be implemented by the processor 910, and related functions implemented by the transceiver unit 710 may be implemented by the processor 910 by controlling the transceiver 920.

The processor 910 may include one or more processors, for example, include one or more central processing units (central processing unit, CPU). When the processor is one CPU, the CPU may be a single-core CPU or a multi-core CPU.

The transceiver 920 is configured to: send data and/or a signal, and receive data and/or a signal. The transceiver may include a transmitter and a receiver. The transmitter is configured to send data and/or a signal, and the receiver is configured to receive data and/or a signal.

The memory 930 includes but is not limited to a random access memory (RAM), a read-only memory (ROM), an erasable programmable memory (EPROM), and a compact disc read-only memory (CD-ROM). The memory 930 is configured to store a related instruction and related data.

The memory 930 is configured to store program code and data of the terminal device, and may be a separate device or integrated into the processor 910.

Specifically, the processor 910 is configured to control information transmission between the transceiver and a network device. For details, refer to the descriptions in the foregoing method embodiments. Details are not described herein again.

It may be understood that FIG. 9 shows only a simplified design of the terminal device. In actual application, the terminal device may also include other necessary components, including but not limited to any quantity of transceivers, processors, controllers, memories, and the like, and all terminal devices that can implement this application shall fall within the protection scope of this application.

In a possible design, the terminal device 900 may be replaced by a chip apparatus, for example, may be a communications chip applicable to the terminal device, and is configured to implement a related function of the processor 910 in the terminal device. The chip apparatus may be a field programmable gate array, a dedicated integrated chip, a system chip, a central processing unit, a network processor, a digital signal processing circuit, or a micro controller unit that is used to implement related functions; or may be a programmable controller or another integrated chip. Optionally, the chip may include one or more memories, configured to store program code. When the code is executed, the processor is enabled to implement a corresponding function.

Figure 10:
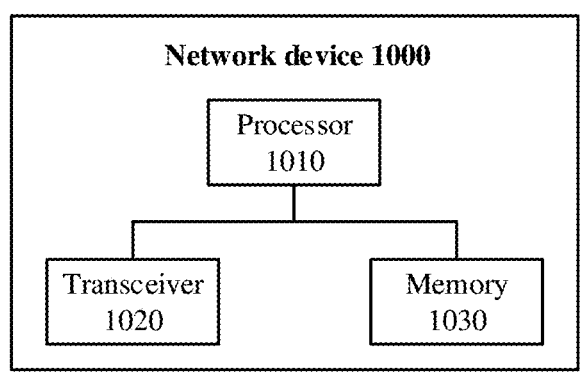
FIG. 10 is a schematic block diagram of another network device according to an embodiment of this application.

FIG. 10 shows a network device 1000 according to an embodiment of this application. The network device may include a processor 1010, a transceiver 1020, and a memory 1030. The processor 1010, the transceiver 1020, and the memory 1030 communicate with each other by using an internal connection path. Related functions implemented by the processing unit 820 in FIG. 8 may be implemented by the processor 1010, and related functions implemented by the transceiver unit 810 may be implemented by the processor 1010 by controlling the transceiver 1020.

The processor 1010 may include one or more processors, for example, include one or more CPUs. When the processor is one CPU, the CPU may be a single-core CPU or a multi-core CPU.

The transceiver 1020 is configured to: send data and/or a signal, and receive data and/or a signal. The transceiver may include a transmitter and a receiver. The transmitter is configured to send data and/or a signal, and the receiver is configured to receive data and/or a signal.

The memory 1030 includes but is not limited to a RAM, a ROM, an EPROM, and a CD-ROM. The memory 1030 is configured to store a related instruction and related data.

The memory 1030 is configured to store program code and data of the terminal device, and may be a separate device or integrated into the processor 1010.

Specifically, the processor 1010 is configured to control information transmission between the transceiver and a terminal device. For details, refer to the descriptions in the foregoing method embodiments. Details are not described herein again.

It may be understood that FIG. 10 shows only a simplified design of the network device. In actual application, the network device may also include other necessary components, including but not limited to any quantity of transceivers, processors, controllers, memories, and the like, and all network devices that can implement this application shall fall within the protection scope of this application.

In a possible design, the network device 1000 may be replaced by a chip apparatus, for example, may be a communications chip applicable to a network device, and is configured to implement a related function of the processor 1010 of the network device. The chip apparatus may be a field programmable gate array, a dedicated integrated chip, a system chip, a central processing unit, a network processor, a digital signal processing circuit, or a micro controller unit that is used to implement related functions; or may be a programmable controller or another integrated chip. Optionally, the chip may include one or more memories, configured to store program code. When the code is executed, the processor is enabled to implement a corresponding function.

An embodiment of this application further provides a communications apparatus, and the communications apparatus may be a terminal device or a circuit. The communications apparatus may be configured to perform an action performed by the terminal device in the foregoing method embodiments.

Figure 11:
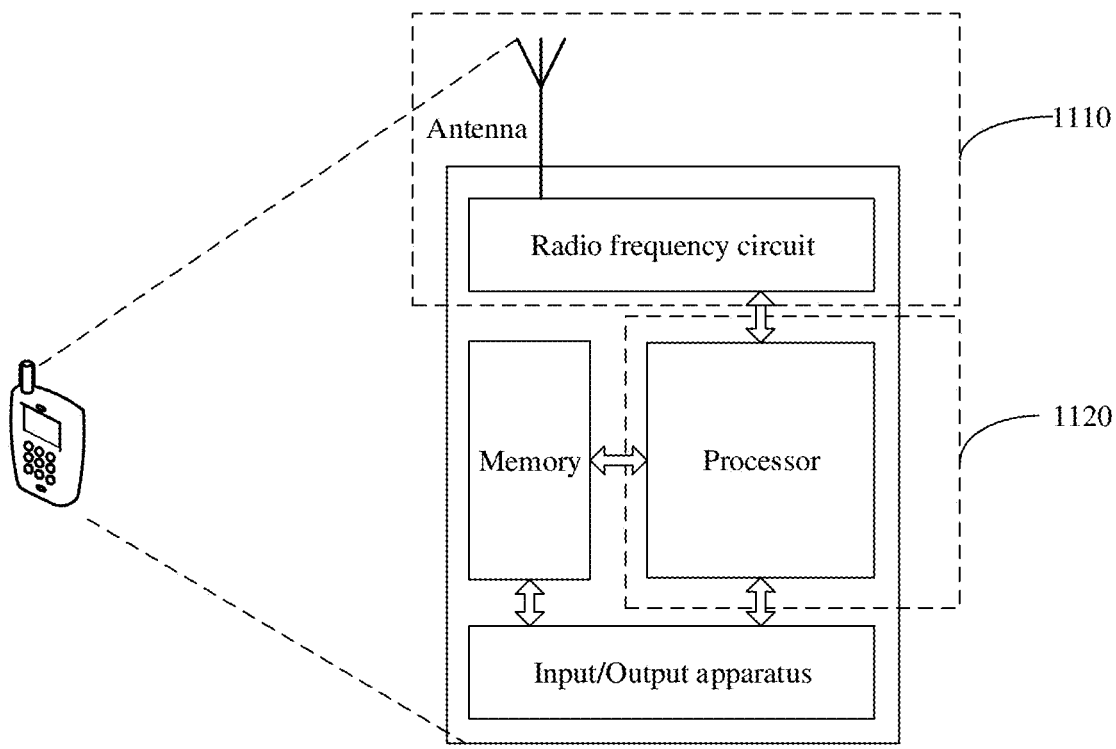
FIG. 11 is a schematic block diagram of a communications apparatus according to an embodiment of this application.

When the communication apparatus is a terminal device, FIG. 11 is a simplified schematic structural diagram of the terminal device. For ease of understanding and illustration, in FIG. 11, an example in which the terminal device is a mobile phone is used. As shown in FIG. 11, the terminal device includes a processor, a memory, a radio frequency circuit, an antenna, and an input/output apparatus. The processor is mainly configured to: process a communications protocol and communication data, and control the terminal device to execute a software program, process data of the software program, and the like. The memory is mainly configured to store the software program and the data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to: receive data input by a user and output data to the user. It should be noted that some types of terminal devices may include no input/output apparatus.

When needing to send data, after performing baseband processing on to-be-sent data, the processor outputs a baseband signal to the radio frequency circuit; and the radio frequency circuit performs radio frequency processing on the baseband signal and then sends a processed radio frequency signal to an external device in a form of an electromagnetic wave by using the antenna. When data is sent to the terminal device, the radio frequency circuit receives a radio frequency signal by using the antenna, converts the radio frequency signal into a baseband signal, and outputs the baseband signal to the processor. The processor converts the baseband signal into data, and processes the data. For ease of description, FIG. 11 shows only one memory and one processor. An actual terminal device product may include one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have sending and receiving functions may be considered as a transceiver unit of the terminal device, and the processor that has a processing function may be considered as a processing unit of the terminal device. As shown in FIG. 11, the terminal device includes a transceiver unit 1110 and a processing unit 1120. The transceiver unit may also be referred to as a transceiver, a transceiver machine, a transceiver apparatus, or the like. The processing unit may also be referred to as a processor, a processing board, a processing module, a processing apparatus, or the like. Optionally, a component that is in the transceiver unit 1110 and that is configured to implement a receiving function may be considered as a receiving unit, and a component that is in the transceiver unit 1110 and that is configured to implement a sending function may be considered as a sending unit. In other words, the transceiver unit 1110 includes the receiving unit and the sending unit. The transceiver unit sometimes may also be referred to as a transceiver machine, a transceiver, a transceiver circuit, or the like. The receiving unit sometimes may also be referred to as a receiving machine, a receiver, a receiving circuit, or the like. The sending unit sometimes may also be referred to as a transmitter machine, a transmitter, a transmitter circuit, or the like.

It should be understood that the transceiver unit 1110 is configured to perform the sending operations and the receiving operations on the terminal device side in the foregoing method embodiments, and the processing unit 1120 is configured to perform other operations different from the receiving operations and the sending operations of the terminal device in the foregoing method embodiments.

For example, in an implementation, the transceiver unit 1110 is configured to perform the sending or receiving operation on the terminal device side in S502 in FIG. 5, the sending operation on the terminal device side in S504, the receiving operation on the terminal device side in S506, and/or the sending operation on the terminal device side in S508; and/or the transceiver unit 1110 is further configured to perform other sending and receiving steps on the terminal device side in this embodiment of this application. The processing unit 1120 is configured to perform S503 and S504 in FIG. 5, and/or the processing unit 1120 is further configured to perform other processing steps on the terminal device side in the embodiments of this application.

For another example, in another implementation, the transceiver unit 1110 is configured to perform the receiving operations on the terminal device side in S601, S602, S605, S607, and S609 in FIG. 6, and the sending operations on the terminal device side in S601, S603, S605, and S608; and/or the transceiver unit 1120 is further configured to perform other receiving and sending steps on the terminal device side in the embodiments of this application. The processing unit 1120 is configured to perform S604 and S606 in FIG. 6, and/or the processing unit 1120 is further configured to perform other processing steps on the terminal device side in the embodiments of this application.

When the communications apparatus is a chip, the chip includes a transceiver unit and a processing unit. The transceiver unit may be an input/output circuit or a communications interface. The processing unit is a processor, a microprocessor, or an integrated circuit integrated into the chip.

Figure 12:
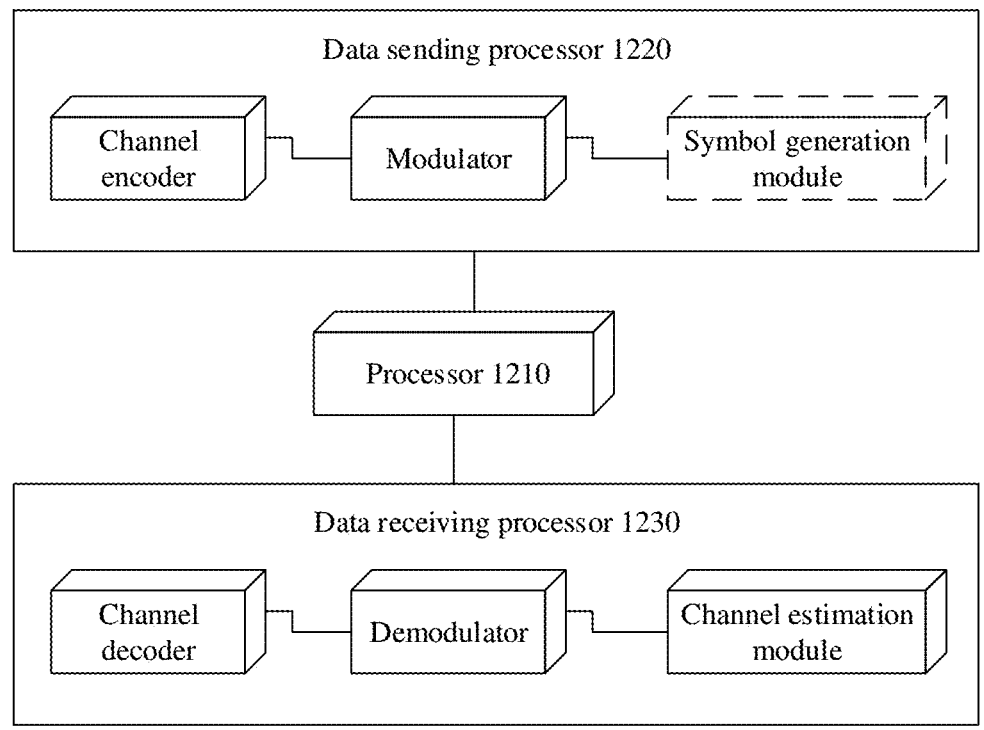
FIG. 12 is another schematic block diagram of a communications apparatus according to an embodiment of this application.

When the communications apparatus in this embodiment is a terminal device, refer to a device shown in FIG. 12. In an example, the device may implement a function similar to that of the processor 910 in FIG. 9. In FIG. 12, the device includes a processor 1210, a data sending processor 1220, and a data receiving processor 1230. The processing unit 720 in the foregoing embodiment may be the processor 1210 in FIG. 12, and implements a corresponding function. The transceiver unit 710 in the foregoing embodiment may be the data sending processor 1220 and/or the data receiving processor 1230 in FIG. 12. Although FIG. 12 shows a channel encoder and a channel decoder, it may be understood that the modules are merely examples, and do not constitute a limitation on this embodiment.

Figure 13:
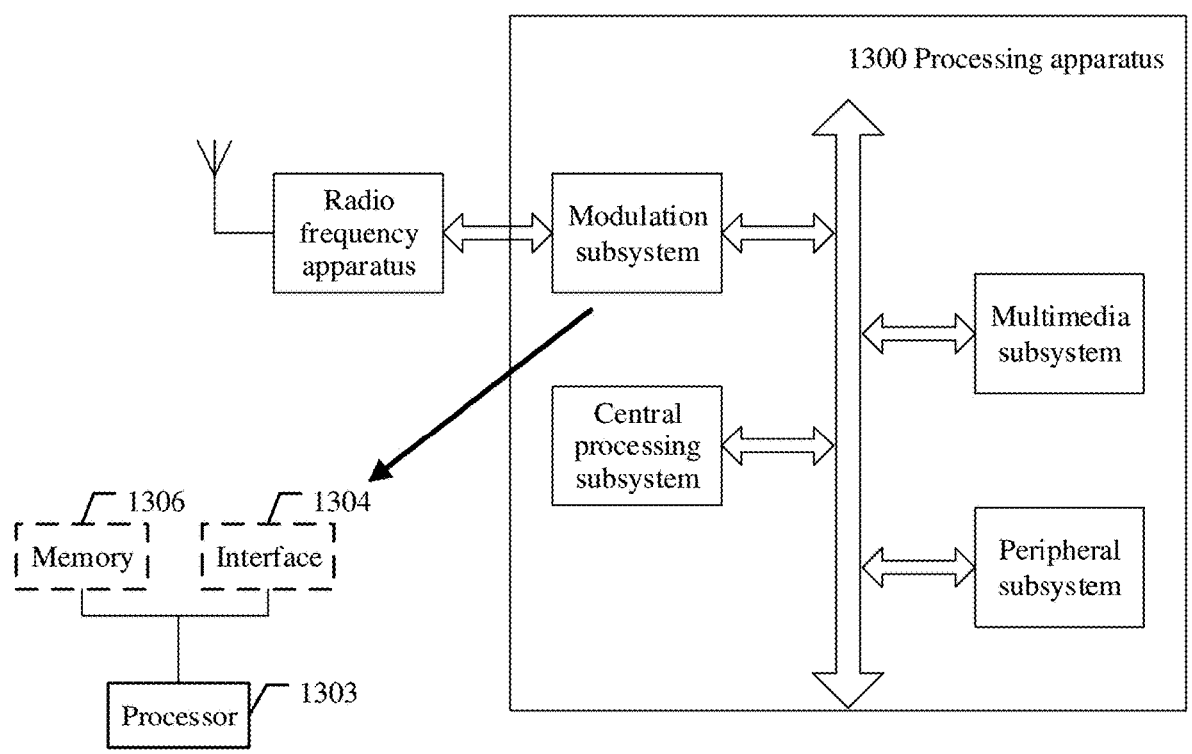
FIG. 13 is still another schematic block diagram of a communications apparatus according to an embodiment of this application.

FIG. 13 shows another form of this embodiment. A processing apparatus 1300 includes modules such as a modulation subsystem, a central processing subsystem, and a peripheral subsystem. A communications apparatus in this embodiment may be used as the modulation subsystem of the processing apparatus 1200. Specifically, the modulation subsystem may include a processor 1303 and an interface 1304. The processor 1303 implements the function of the processing module 720, and the interface 1304 implements the function of the transceiver module 710. In another variation, the modulation subsystem includes a memory 1306, a processor 1303, and a program that is stored in the memory 1306 and that can be run on the processor. When executing the program, the processor 1303 implements the method on the terminal device side in the foregoing method embodiments. It should be noted that the memory 1306 may be non-volatile or volatile. The memory 1306 may be located in the modulation subsystem, or may be located in the processing apparatus 1300, provided that the memory 1306 can be connected to the processor 1303.

In another form of this embodiment, a computer-readable storage medium is provided. The computer-readable storage medium stores an instruction. When the instruction is executed, the method on the terminal device side in the foregoing method embodiments is performed.

In another form of this embodiment, a computer program product that includes an instruction is provided. When the instruction is executed, the method on the terminal device side in the foregoing method embodiments is performed.

An embodiment of this application further provides another communications apparatus. The communications apparatus may be a network device or a circuit. The communications apparatus may be configured to perform an action performed by the network device in the foregoing method embodiments.

Figure 14:
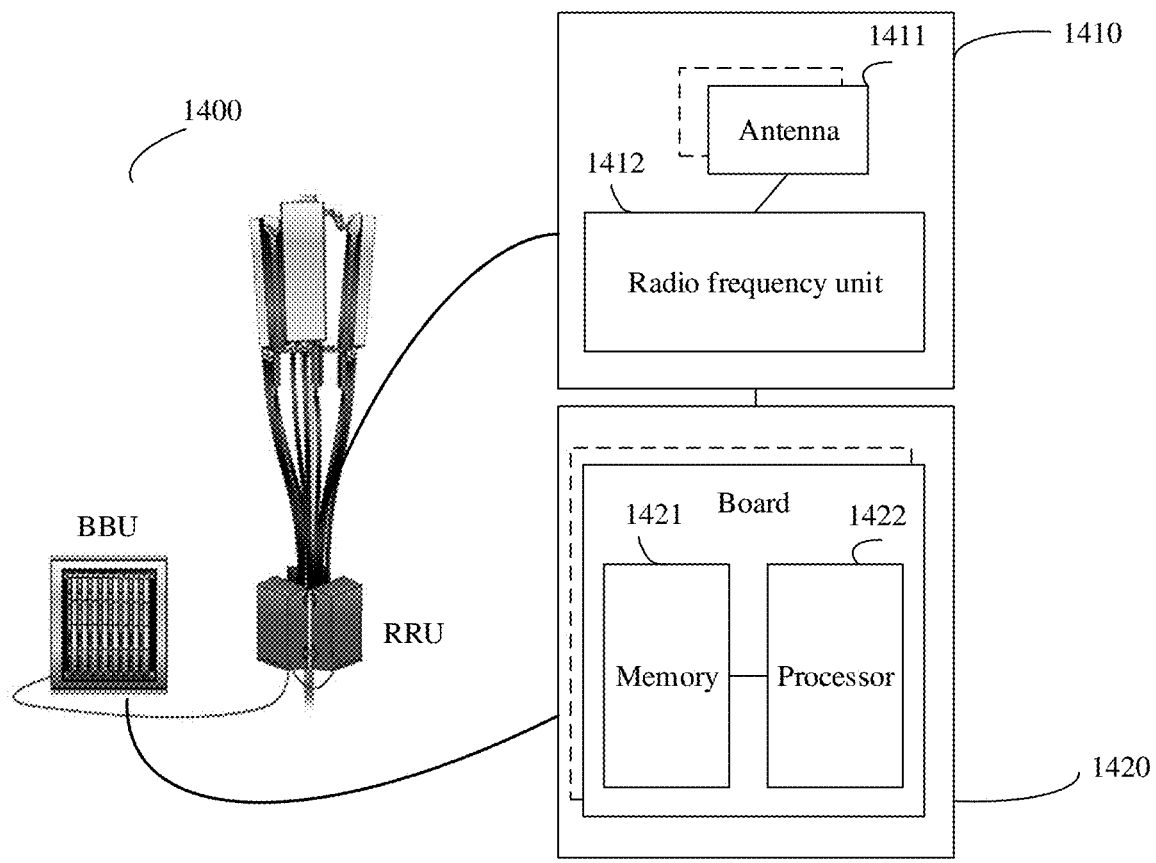
FIG. 14 is still another schematic block diagram of a communications apparatus according to an embodiment of this application.

When the apparatus in this embodiment is a network device, the network device may be shown in FIG. 14. The apparatus 1400 includes one or more radio frequency units, for example, a remote radio unit (remote radio unit, RRU) 1410 and one or more baseband units (baseband unit, BBU) (which may also be referred to as a digital unit, digital unit, DU) 1420. The RRU 1410 may be referred to as a transceiver module, and corresponds to the transceiver unit 810 in FIG. 8. Optionally, the transceiver module may also be referred to as a transceiver machine, a transceiver circuit, a transceiver, or the like, and may include at least one antenna 1411 and a radio frequency unit 1412. The RRU 1410 is mainly configured to: receive and send a radio frequency signal and perform conversion between the radio frequency signal and a baseband signal, for example, is configured to send various information (for example, a random access request) to a terminal device. The BBU 1410 is mainly configured to perform baseband processing, control the base station, and the like. The RRU 1410 and the BBU 1420 may be physically disposed together, or may be physically disposed separately, to be specific, in a distributed base station.

The BBU 1420 is a control center of the base station, may also be referred to as a processing module, and may correspond to the processing unit 820 in FIG. 8; and is mainly configured to complete a baseband processing function, such as channel coding, multiplexing, modulation, and spectrum spreading. For example, the BBU (processing module) may be configured to control the base station to perform an operation procedure related to the network device in the foregoing method embodiments, for example, processing on the first random access resource and the second configuration parameter.

In an example, the BBU 1420 may include one or more boards. A plurality of boards may jointly support a radio access network (for example, an LTE network) of a single access standard, or may separately support radio access networks (for example, an LTE network, a 5G network, and another network) of different access standards. The BBU 1420 further includes a memory 1421 and a processor 1422. The memory 1421 is configured to store a necessary instruction and necessary data. The processor 1422 is configured to control the base station to perform a necessary action, and for example, is configured to control the base station to perform an operation procedure related to a network device in the foregoing method embodiments. The memory 1421 and the processor 1422 may serve the one or more boards. In other words, the memory and the processor may be independently disposed on each board. Alternatively, a plurality of boards may share the same memory and the same processor. In addition, a necessary circuit may be disposed on each board.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a specific working process of the foregoing system, apparatus, and unit, refer to a corresponding process in the foregoing method embodiments, and details are not described herein again.

In the several embodiments provided in this application, it should be understood that, the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the current system, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit a protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
    performing, by a terminal device, data transmission according to a first configuration parameter of a currently activated first bandwidth part (BWP), wherein the first configuration parameter of the currently activated first BWP comprises a first resource offset and a first bandwidth;
    determining, by the terminal device, a first random access resource and a second configuration parameter for random access if the currently activated first BWP does not include a random access resource when a random access procedure is initiated, wherein the second configuration parameter comprises a second resource offset and a second bandwidth, wherein a configuration parameter of a second BWP comprises the first random access resource and the second configuration parameter;
    sending, by the terminal device, a random access request to a network device on the first random access resource; and
    receiving, by the terminal device, a random access response according to the second configuration parameter, wherein receiving the random access response according to the second configuration parameter comprises:
   determining first scheduling information according to the second configuration parameter, wherein the first scheduling information indicates a first resource; and
   receiving, by the terminal device on the first resource, the random access response from the network device;
parsing, by the terminal device based on the second configuration parameter, second scheduling information carried in the random access response;
sending a random access message to the network device based on the second scheduling information; and
forcibly stopping, by the terminal device, in response to the terminal device receiving indication information for deactivating the currently activated first BWP, a random access procedure.

2. The method according to claim 1, wherein:
information about the first random access resource or information about the second configuration parameter is carried in a system broadcast message.

3. The method according to claim 2, wherein a radio resource control (RRC) reconfiguration message or the system broadcast message carries the configuration parameter of the second BWP.

4. The method according to claim 1, wherein the first configuration parameter of the currently activated first BWP further comprises a first subcarrier spacing, and the configuration parameter of the second BWP further comprises a second subcarrier spacing.

5. A device, comprising:
a processor; and
a non-transitory memory, wherein the non-transitory memory stores an execution instruction; and when the processor executes the execution instruction to enable the device to:
perform data transmission according to a first configuration parameter of a currently activated first bandwidth part (BWP), wherein the first configuration parameter of the currently activated first BWP comprises a first resource offset and a first bandwidth;
determine a first random access resource and a second configuration parameter for random access if the currently activated first BWP does not include a random access resource when a random access procedure is initiated, wherein the second configuration parameter comprises a second resource offset and a second bandwidth, wherein a configuration parameter of a second BWP comprises the first random access resource and the second configuration parameter;
send a random access request to a network device on the first random access resource; and
receive a random access response according to the second configuration parameter, wherein the instructions to receive the random access response according to the second configuration parameter comprise instructions to:
   determine first scheduling information according to the second configuration parameter, wherein the first scheduling information indicates a first resource; and
   receive, on the first resource, the random access response from the network device;
parse based on the second configuration parameter, second scheduling information carried in the random access response;
send a random access message to the network device based on the second scheduling information; and
forcibly stop, in response to the device receiving indication information for deactivating the currently activated first BWP, a random access procedure.

6. The device according to claim 5, wherein:
information about the first random access resource or information about the second configuration parameter is carried in a system broadcast message.

7. The device according to claim 6, wherein a radio resource control (RRC) reconfiguration message or the system broadcast message carries the configuration parameter of the second BWP.

8. The device according to claim 5, wherein the first configuration parameter of the currently activated first BWP further comprises a first subcarrier spacing, and the configuration parameter of the second BWP further comprises a second subcarrier spacing.

9. A non-transitory computer-readable storage medium having processor-executable instructions stored thereon, wherein the processor-executable instructions, when executed, facilitate:
performing, by a terminal device, data transmission according to a first configuration parameter of a currently activated first bandwidth part (BWP), wherein the first configuration parameter of the currently activated first BWP comprises a first resource offset and a first bandwidth;
determining, by the terminal device, a first random access resource and a second configuration parameter for random access if the currently activated first BWP does not include a random access resource when a random access procedure is initiated, wherein the second configuration parameter comprises a second resource offset and a second bandwidth, wherein a configuration parameter of a second BWP comprises the first random access resource and the second configuration parameter;
sending, by the terminal device, a random access request to a network device on the first random access resource; and
receiving, by the terminal device, a random access response according to the second configuration parameter, wherein receiving the random access response according to the second configuration parameter comprises:
   determining first scheduling information according to the second configuration parameter, wherein the first scheduling information indicates a first resource; and
   receiving, by the terminal device on the first resource, the random access response from the network device;
parsing, by the terminal device based on the second configuration parameter, second scheduling information carried in the random access response;
sending a random access message to the network device based on the second scheduling information; and
forcibly stopping, by the terminal device, in response to the terminal device receiving indication information for deactivating the currently activated first BWP, a random access procedure.

10. The non-transitory computer-readable storage medium according to claim 9, wherein the first configuration parameter of the currently activated first BWP further comprises a first subcarrier spacing, and the configuration parameter of the second BWP further comprises a second subcarrier spacing.

11. The non-transitory computer-readable storage medium according to claim 9, wherein information about the first random access resource or information about the second configuration parameter is carried in a system broadcast message.

12. The non-transitory computer-readable storage medium according to claim 11, wherein a radio resource control (RRC) reconfiguration message or the system broadcast message carries the configuration parameter of the second BWP.

* * * * *